United States Patent [19]
Ota

[11] Patent Number: 5,959,752
[45] Date of Patent: Sep. 28, 1999

[54] OPTICAL TRANSCEIVER AND OPTICAL COMMUNICATIONS NETWORK FOR BOTH OF OPTICAL FIBER TRANSMISSION AND FREE SPACE TRANSMISSION

[75] Inventor: Takeshi Ota, Ashigarakami-gun, Japan

[73] Assignee: Fuji Xerox Co., Ltd., Tokyo, Japan

[21] Appl. No.: 08/733,603

[22] Filed: Oct. 18, 1996

[30] Foreign Application Priority Data

Oct. 19, 1995 [JP] Japan ................................. 7-294953
Feb. 20, 1996 [JP] Japan ................................. 8-55338

[51] Int. Cl.$^6$ ................................................. H04B 10/00
[52] U.S. Cl. ........................... 359/152; 359/159; 359/163; 359/173
[58] Field of Search ..................................... 359/125, 121, 359/152, 153, 159, 163, 172, 173, 179, 183, 195

[56] References Cited

U.S. PATENT DOCUMENTS

| 4,747,651 | 5/1988 | Weismeier .................................. 385/46 |
| 4,948,218 | 8/1990 | Kobayashi et al. ................... 350/96.16 |
| 5,144,466 | 9/1992 | Nakamura et al. ...................... 359/123 |
| 5,282,257 | 1/1994 | Ota ............................................ 385/46 |
| 5,748,813 | 5/1998 | Cassidy et al. ............................ 385/24 |

FOREIGN PATENT DOCUMENTS

| A-58-90843 | 5/1983 | Japan . |
| A-2-98253 | 4/1990 | Japan . |
| A-2-140025 | 5/1990 | Japan . |
| A-2-162939 | 6/1990 | Japan . |
| A-3-102932 | 4/1991 | Japan . |
| A-270432 | 12/1991 | Japan . |
| A-3-296332 | 12/1991 | Japan . |
| A-4-372909 | 12/1992 | Japan . |
| A-14385 | 1/1993 | Japan . |
| A-5-3457 | 1/1993 | Japan . |

OTHER PUBLICATIONS

Nikkei Electronics Feb. 13, 1995 (No. 628), pp. 101–110.
Nikkei Electronics Jan. 17, 1994 (No. 599), "Fiber Channel", pp. 127–137.

Electronics Letters, vol. 29, No. 10, May 1993, "Four–port Multimode Interconnectable Star Coupler", T. Ota, pp. 919–920.

Electronics Letters, vol. 20, No. 25/26, 1984, "New Collision Detection Technique and Its Performance", K. Oguchi et al. pp. 1,062–1,063.

Applied Optics, vol. 33, No. 19, Jul. 1994, "Graded–Index Polymer Optical Fiber for High–Speed Data Communication", T. Ishigure et al., pp. 4261–4266.

Journal of Lightwave Technology, vol. LT–1, No. 1, Feb. 1984, "Optical Cascade Star Network–A New Configuration for a Passive Distribution System with Optical Collision Detection Capability", T. Tamura et al., pp–61–66.

Communication of the ACM, vol. 23, No. 12, Dec. 1980, "Measured Performance of and Ethernet Local Network", J.F. Shoch et al., pp–711–720.

Ohmsha, Ltd., "Laser Handbook", p. 758.

*Primary Examiner*—Edward Lefkowitz
*Attorney, Agent, or Firm*—Oliff & Berridge, PLC

[57] ABSTRACT

A cable network is constituted such that interconnectable, passive 4-terminal star couplers are connected to each other via optical fiber cables and a bi-directional optical relay amplifier. Cells each constituted by using free space transmission light are integrated by the cable network. An optical signal transmitted from or directed to a mobile station in a cell is linked to the cable network via an optical relay amplifier, which provides interface between free space transmission light and guided light. Even in a case where a barrier interposed between two mobile stations prevents a direct communication between those stations, a collision between those stations can be detected by a collision detection proxy server having functions of collision detection according to the principle of code transition rule violation and jamming signal transmission. A communication between those stations can be realized by connecting, to the cable network, a relay proxy server having a packet relay and transmitting function.

22 Claims, 35 Drawing Sheets

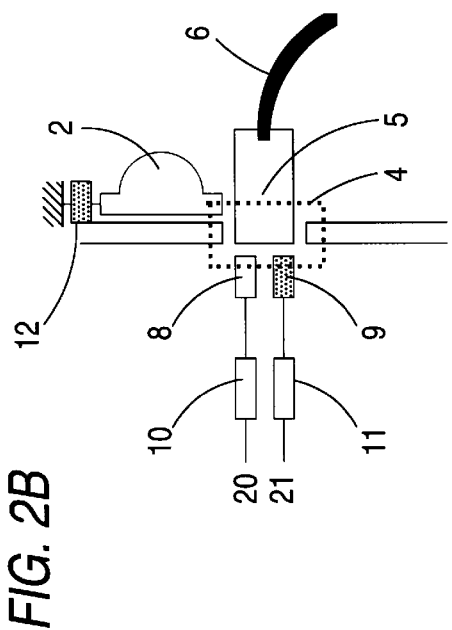
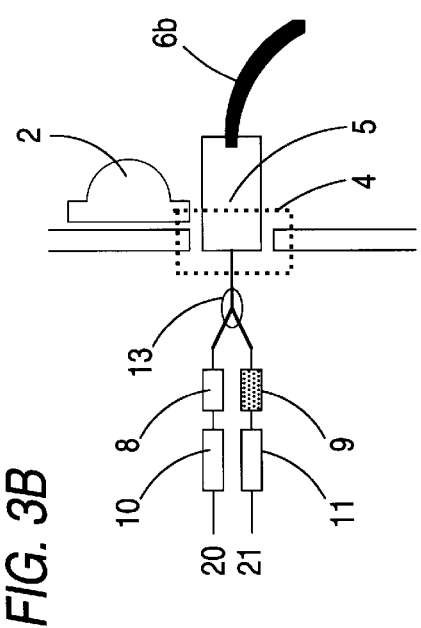
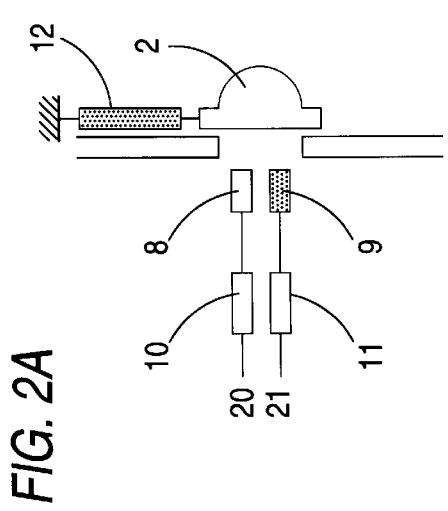
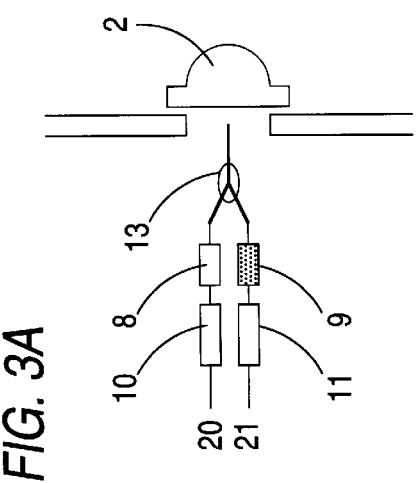

COLLISION DETECTION

FIG. 34

| ITEMS | INVENTION | FIBER CHANNEL | IrDA |
|---|---|---|---|
| MODULATION | RZ | NRZ | RZ |
| CODING | BLOCK CODING | BLOCK CODING | DIPULSE CODING |
| MEDIUM | OPTICAL FIBER/ FREE SPACE | OPTICAL FIBER | FREE SPACE |
| WAVELENGTH | SEE FIG. 35A | 780/1300nm | 780nm |
| LIGHT SOURCE | SLD/LD/LED | LD/LED | LED |
| FORM OF TRANSMISSION PATH | STAR (OPTICAL FIBER)/ BUS (FREE SPACE) | POINT-TO-POINT (OPTICAL FIBER) | POINT-TO-POINT (FREE SPACE) |
| WAVELENGTH MULTIPLEXING | 2-WAVELENGTH MULTIPLEXING (ADDITIONAL) | — — | — — |
| PROTOCOL | CSMA/CD TDMA-TOKKEN BUS (ADDITIONAL) | POINT-TO-POINT | POINT-TO-POINT |
| COLLISION DETECTION | CARRIER SENSING | — — | — — |

FIG. 35A

| MEDIUM | WAVELENGTH | LIGHT SOURCE |
| --- | --- | --- |
| FREE SPACE | 500 ~ 900nm<br>1200 ~ 2000nm | SLD/LED<br>SLD/LED/LD |
| OPTICAL FIBER (SILICA) | 500 ~ 2000nm | SLD/LED/LD |
| OPTICAL FIBER (PLASTIC) | 500 ~ 900nm | SLD/LED/LD |

FIG. 35B

| MEDIUM | WAVELENGTH | LIGHT SOURCE | |
| --- | --- | --- | --- |
| | | MATERIAL | TYPE |
| FREE SPACE | | | |
| $\lambda_3 (\lambda_4)$ | 1250 ~ 1350nm | InGaAsP | ① SLD ② LD ③ LED |
| $\lambda_4 (\lambda_3)$ | 1450 ~ 1550nm | InGaAsP | ① SLD ② LD ③ LED |
| OPTICAL FIBER (SILICA) | | | |
| $\lambda_1 (\lambda_2)$ | 1250 ~ 1350nm | InGaAsP | ① SLD ② LD ③ LED |
| $\lambda_2 (\lambda_1)$ | 1450 ~ 1550nm | InGaAsP | ① SLD ② LD ③ LED |

FIG. 36A

| MEDIUM | WAVELENGTH | LIGHT SOURCE | |
|---|---|---|---|
| | | MATERIAL | TYPE |
| FREE SPACE | | | |
| $\lambda_3 (\lambda_4)$ | 1250 ~ 1350nm | InGaAsP | ① SLD ② LD ③ LED |
| $\lambda_4 (\lambda_3)$ | 1450 ~ 1550nm | InGaAsP | ① SLD ② LD ③ LED |
| OPTICAL FIBER (PLASTIC) | | | |
| $\lambda_1 (\lambda_2)$ | 630 ~ 680nm | AlGaInP | ① SLD ② LD ③ LED |
| $\lambda_2 (\lambda_1)$ | 750 ~ 830nm | AlGaAs | ① SLD ② LD ③ LED |

FIG. 36B

| MEDIUM | WAVELENGTH | LIGHT SOURCE | |
|---|---|---|---|
| | | MATERIAL | TYPE |
| FREE SPACE | | | |
| $\lambda_3 (\lambda_4)$ | 1700 ~ 1850nm | InGaAsP-STRAINED | ① SLD ② LD ③ LED |
| $\lambda_4 (\lambda_3)$ | 1850 ~ 2000nm | InGaAsP-STRAINED | ① SLD ② LD ③ LED |
| OPTICAL FIBER (PLASTIC) | | | |
| $\lambda_1 (\lambda_2)$ | 450 ~ 500nm | Zn(Mg)SSe | ① SLD ② LD ③ LED |
| $\lambda_2 (\lambda_1)$ | 630 ~ 680nm | AlGaInP | ① SLD ② LD ③ LED |

FIG. 37A

| MEDIUM | WAVELENGTH | LIGHT SOURCE | |
| --- | --- | --- | --- |
| | | MATERIAL | TYPE |
| FREE SPACE | 1250 ~ 1350nm | InGaAsP | ① SLD ② LED |
| OPTICAL FIBER (SILICA) | 1250 ~ 1350nm | InGaAsP | ① SLD ② LED |

FIG. 37B

| MEDIUM | WAVELENGTH | LIGHT SOURCE | |
| --- | --- | --- | --- |
| | | MATERIAL | TYPE |
| FREE SPACE | 1250 ~ 1350nm | InGaAsP | ① SLD ② LED |
| OPTICAL FIBER (PLASTIC) | 630 ~ 680nm | AlGaInP | ① SLD ② LED |

OPTICAL TRANSCEIVER AND OPTICAL COMMUNICATIONS NETWORK FOR BOTH OF OPTICAL FIBER TRANSMISSION AND FREE SPACE TRANSMISSION

BACKGROUND OF THE INVENTION

1. Field of the Invention

The present invention relates to an optical transceiver usable for both of optical fiber transmission and free space transmission as well as to an optical communications network where both of optical fiber transmission and free space transmission can be used.

2. Description of the Related Art

There have been made many attempts to use optical communication or optical transmission for short-distance signal transmission. Among those attempts are an optical LAN (local area network) in which optical communication is applied to a LAN, an optical bus in which optical transmission is applied to an external bus for connection between a computer and peripheral devices, and a wireless communications system using optical transmission.

FIG. 38A shows an example of a wireless communications system using optical transmission, which is an optical transmission system using infrared light that is propagated through a free space. Optical communication is performed between terminal stations 110 by means of free space light. Examples of this type of system are an IrDA (infrared data association) system and an ASK (amplitude shift keying) system (see Nikkei Electronics 1995.2.13 (No. 628), pp. 101–110). The IrDA system is a point-to-point optical communications system, and employs RZ (return to zero) modulation and dipulse coding. The RZ modulation means a scheme in which light is not output during absence of a transmission request. The dipulse coding means a coding scheme in which pulse widths or positions are defined for "1" and "0."

FIG. 38B shows a point-to-point optical transmission system using an optical fiber. Optical communication is performed between terminal stations 112 by means of light that is propagated by an optical fiber 113. In this connection, a technique called "fiber channel" is known (see Nikkei Electronics 1994.1.17 (No. 599), pp. 127–137), which can be used in a LAN or an external bus. The fiber channel technique employs NRZ (non-return to zero) modulation and block coding. The NRZ modulation means a scheme in which light is output even during absence of a transmission request. The block coding means a coding scheme in which 4-bit data are allocated to 5-bit patterns such that the possibility of continuous occurrence of 1's or 0's is minimized.

FIG. 38C is an optical communications system using a star coupler, in which optical communication is performed between terminal stations 114 via a broadcasting bus system that is formed by using a star coupler 115. In contrast to the case of FIG. 38B, this optical communications system enables a one-vs.-many communication. Related techniques are described in Japanese Unexamined Patent Publication Nos. Sho. 58-90843, Hei. 3-296,332, Hei. 4-372909, and Hei. 5-3457, U.S. Pat. No. 5,282,257, and a paper by Takeshi Ohta, "Four-port Multimode Interconnectable Star Coupler," Electronics Letters, Vol. 29, No. 10, pp. 919–920, 1993. Also known is an optical communications system using a broadcasting bus system in which wavelength multiplexing is effected. Related techniques are described in Japanese Unexamined Patent Publication Nos. Hei. 2-98253, Hei. 2-162939, Hei. 3-102932, Hei. 3-270432, and Hei. 5-14385, and U.S. Pat. No. 5,144,466.

FIG. 39 show details of an example of the optical communications network of FIG. 38C using a star coupler. In FIG. 39, reference numerals 126a and 126b denote optical fibers; 127, stations; 125, a mixing-rod-type star coupler; and 124, terminals. Electrical signals that are output from the respective stations 127 are converted by light-emitting elements 122 into optical signals, which are supplied to the star coupler 125 via the optical fibers 126a. After being mixed by the star coupler 125, the optical signals are distributed to photodetecting elements 126b via the optical fibers 126b. The optical signals are converted by the photodetecting elements 123 to electrical signals, which are input to the respective stations 127. Constructed in this manner, this network has a feature that a signal that is output from one station is transmitted to the other stations, i.e., a broadcasting feature.

However, the conventional star coupler 125 (not interconnectable) of the above network has a feature that a signal transmitted from one station is also distributed to its own reception port. This feature makes collision detection difficult for the following reason. Since in general the passive star coupler 125 is insufficient in the uniformity of the distribution ratio, it is difficult to use, as a collision detection method, a level difference method which is used in, for instance, an Ethernet with a coaxial cable.

To solve this problem, a collision detection method based on a code rule violation (CRV) technique has been proposed for use in the network as shown in FIG. 39 (see K. Oguchi and Y. Hakamada: "New Collision Detection Technique and its Performance," Electronics Letters, Vol. 20, No. 25/26, pp. 1,062–1,063, 1984).

The code rule violation method utilizes the fact that in Manchester coding used in an Ethernet, 1-bit data is represented by a 2-bit code, that is, the Manchester coding is redundant.

FIG. 38D shows a network in which terminal stations 116 are connected to each other in a daisy-chain-like manner via optical fibers 113. Related techniques are described in Japanese Unexamined Patent Publication No. Hei. 2-140025, and U.S. Pat. Nos. 4,948,218 and 4,747,651.

Although the above-described optical communications systems and transmission systems are similar to each other, they have almost no interconnectability or compatibility at present. For examples because of the use of NRZ modulation, the terminal station 112 of the point-to-point optical transmission system of FIG. 28B using an optical fiber cannot be used in the free space transmission system of FIG. 38A or the network of FIG. 38C using a star coupler.

By the way, in wireless communications systems using optical transmission, there is a concern that transmission light may enter the eyes of a-person and impair his health.

Furthers there is a technical trend that a graded-index (GI) plastic optical fiber having a large core diameter (0.5 mm) is attracting much attention (see T. Ishigure et al.: "Graded-index Polymer Optical Fiber for High-speed Data Communication," Applied Optics, Vol. 33, No. 19, pp. 4261–4266, 1994). It is expected that the graded index profile will enable high-speed transmission, and that the thick core will greatly reduce the cost of an optical connector.

SUMMARY OF THE INVENTION

An object of the present invention is to provide an optical transceiver usable for both of optical fiber transmission and free space transmission.

Another object of the invention is to provide an optical communications network where both of optical fiber transmission and free space transmission can be used.

A further object of the invention is to prevent a health problems as would otherwise be caused by entrance of light into human eyes in a free space transmission system.

According to a first aspect of the invention, there is provided an optical transceiver comprising:

a light-emitting element for emitting an optical signal;

photodetecting element for converting an optical signal into an electrical signal;

first coupling means for optically coupling the light-emitting element and the photodetecting element to an optical fiber transmission path;

second coupling means for optically coupling the light-emitting element and the photodetecting element to a free space when the light-emitting element and the photodetecting element are not coupled to the optical fiber transmission path by the first coupling means;

driving means for driving the light-emitting element in accordance with an electrical signal that is supplied from an external system; and output means for outputting to the external system, the electrical signal produced by the photodetecting element.

This optical transceiver can be used for both of free space communication and optical fiber communication by physically switching between an optical signal propagating through the optical fiber transmission path and a signal propagating through the free space. This optical transceiver has another advantage of simple configuration.

In the above optical transceiver, wavelength multiplexing can be performed by providing a plurality of light-emitting elements capable of emitting optical signals of different wavelengths and a plurality of photodetecting elements for receiving optical signals of the difference wavelengths. The wavelength multiplexing provides an advantage of an increased number of transmission channels.

According to a second aspect of the invention, there is provided an optical transceiver comprising:

a first light-emitting element for emitting an optical signal to an optical fiber transmission path;

a first photodetecting element for converting an optical signal coming from the optical fiber transmission path into an electrical signal;

a second light-emitting element for emitting an optical signal to a free space;

a second photodetecting element for converting an optical signal coming from the free space into an electrical signal;

first coupling means for optically coupling the first light-emitting element and the first photodetecting element to the optical fiber transmission path;

second coupling means for optically coupling the second light-emitting element and the second photodetecting element to the free space;

a matrix circuit having a transfer characteristic in which all of diagonal elements are zero, for supplying the electrical signal produced by the first photodetecting element to the second light-emitting element or an external system, supplying the electrical signal produced by the second photodetecting element to the first light-emitting element or the external system, and supplying an electrical signal that is supplied from the external system to the first or second photodetecting element;

first driving means for driving the first light-emitting element in accordance with the electrical signal that is supplied from the matrix circuit to the first light-emitting element; and second driving means for driving the second light-emitting element in accordance with the electrical signal that is supplied from the matrix circuit to the second light-emitting element.

This configuration enables electrical interface between an optical signal propagating through the optical fiber transmission path and an optical signal propagating through the free space.

According to a third aspect of the invention, there is provided an optical communications network comprising:

a transmitter for transmitting a guided light wave signal that is modulated according to a RZ scheme to an optical fiber transmission path;

a star coupler having a transfer matrix in which all of diagonal elements are zero, and having at least first and second terminals;

conversion means for receiving the guided light wave signal from the optical fiber transmission path, converting the received guided light wave signal into a free space transmission optical signal that is modulated according to the RZ scheme, and transmitting the optical signal to a free space;

a receiver for receiving the free space transmission optical signal that is transmitted from the conversion means via the free space; and the optical fiber transmission path for connecting the transmitter to the first terminal of the star coupler, and for connecting the second terminal of the star coupler to the conversion means, thereby supplying the guided light wave signal that is transmitted from the transmitter to the conversion means via the star coupler.

According to a fourth aspect of the invention, there is provided an optical communications network comprising:

a transmitter for transmitting a free space transmission optical signal that is modulated according to a RZ scheme to a free space;

conversion means for receiving the free space transmission optical signal from the free space converting the received free space transmission optical signal into a guided light wave signal that is modulated according to the RZ scheme, and transmitting the guided light wave signal to an optical fiber transmission path;

a star coupler having a transfer matrix in which all of diagonal elements are zero, and having at least first and second terminals;

a receiver for receiving the guided light wave signal from the optical fiber transmission path; and the optical fiber transmission path for connecting the conversion means to the first terminal of the star coupler, and for connecting the second terminal of the star coupler to the receiver, thereby supplying the guided light wave signal that is transmitted from the conversion means to the receiver via the star coupler.

In each of the optical communications networks according to the third and fourth aspects, the network for interconnecting optical transceivers by the optical fiber transmission path and the star coupler and the network for interconnecting optical transceivers via the free space coexist so as to be able to communicate with each other. Since both of an optical fiber transmission signal and a free space transmission signal are modulated according to the RZ scheme, they can coexist in the physical layer level of the OSI communication function layered model. The NRZ modulation scheme, in which light is emitted even in the absence of a transmission signal, is not preferred because DC components of light are accumulated when a passive star coupler or a free space is used. Preferably, the optical transceiver according to the first or second embodiment is used in the optical communications network concerned.

In the optical communications network concerned, free space propagation light is prevented from causing health problems in human eyes by setting its wavelength in a range of 1,200–2,000 nm, because light in this range exhibits a sufficiently small retina photocoagulation efficiency.

According to a fifth embodiment of the invention, there is provided an optical communications network comprising:

a cable network having a characteristic that all of diagonal elements of a transfer matrix are zero;

linking means for linking the cable network to at least one cell that is constituted by using free space light transmission in a physical layer of a communication function layered model; and at least one mobile station to be connected to the cable network by free space light transmission.

In this optical communications network, the cable network has the characteristic that all the diagonal elements of the transfer matrix are zero. That is, in this network, a signal transmitted from a certain station is not distributed to the reception port of that station This configuration is implemented by interconnecting optical transceivers of the respective stations by a star coupler having a characteristic that all the diagonal elements of the transfer matrix are zero. Since the cells are constituted by using free space transmission light that is linked to the cable network in the physical layer of a communication function layered model such as the OSI 7-layer model, an optical signal propagating through an optical fiber cable and an optical signal propagating through the free space can be interfaced.

Since the cable network has the characteristic that all the diagonal elements of the transfer matrix are zero, there can be employed a collision detection protocol in which a station judges that a collision has occurred when it receives a certain signal during signal transmission. However, this communications network may encounter what is called a "hidden terminal problem," in which case a collision cannot be detected. For examples where a barrier exists in a free space between two mobile stations in a cell, they cannot communicate with each other via their optical transceivers. Further, a collision cannot be detected when those two stations start transmission at the same time.

To solve the hidden terminal problem, according to the invention, there is provided a collision detection proxy processing device which is connected to the cable network via an optical fiber cable and performs collision detection according to the principle of code transition rule violation.

Since signals from a plurality of mobile stations reach a station on the cable network, even a collision state that cannot be detected by a mobile station can be detected by providing, on the cable network, a processing device which performs collision detection by proxy. The employment of code transition rule violation allows proxy detection on the cable network of a collision among a plurality of stations. Further, mobile stations can be informed of a result of proxy detection by transmitting a jamming signal to those stations.

To solve the hidden terminal problem according to the invention, a relay proxy processing device having a packet relay and retransmitting function is provided on the cable network.

With this configuration, even where a barrier prevents a direct communication among a plurality of mobile stations, a packet can be exchanged by those stations via the relay proxy processing device, because signals transmitted from those stations reach a station on the cable network.

There may be provided a single proxy processing device having both functions of the collision detection proxy and the relay proxy. In this case, even in a situation that there would otherwise occur a hidden terminal problem, a collision can be detected reliably by the collision detection proxy function and a communication between mobile stations can be performed reliably by the relay proxy function.

A single optical coupler, optical receiver, and optical transmitter may be shared by the above two functions. In this case, the device can be simplified as compared to the case of implementing those functions separately.

BRIEF DESCRIPTION OF THE DRAWINGS

FIGS. 2A and 2B are schematic sectional views showing an internal configuration of the optical transceiver of the first embodiment and corresponding to the free space transmission state and the optical fiber transmission state, respectively;

FIGS. 3A and 3B are schematic sectional views showing an internal configuration of an optical transceiver according to a second embodiment of the invention and corresponding to a free space transmission state and an optical fiber transmission state, respectively;

FIG. 34 compares specific examples of various items of a network physical layer of the invention with corresponding items of two conventional networks;

FIGS. 35A–35B, 36A–36B, and 37A–37B show examples of combinations of a transmission medium, a wavelength range, and a light source according to the invention;

DESCRIPTION OF THE PREFERRED EMBODIMENTS

Embodiment 1

Optical transceiver

Figure 1A:
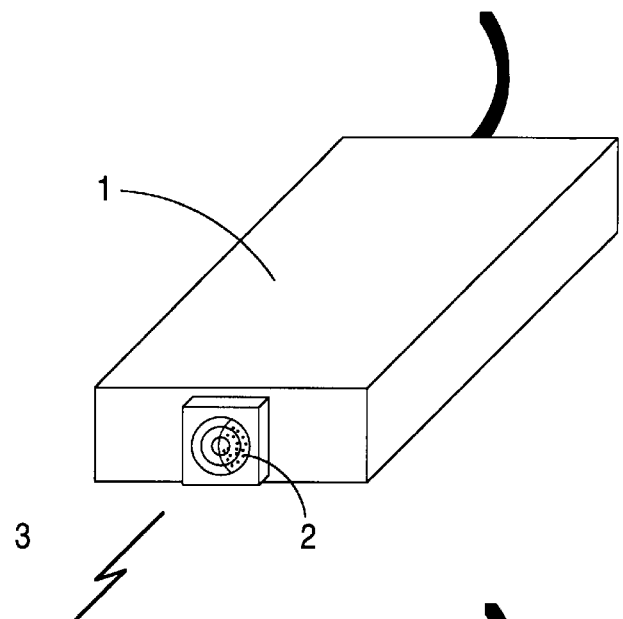
FIG. 1A is a perspective view showing an optical transceiver according to a first embodiment of the present invention in a state that it is used for free space transmission.
Figure 1B:
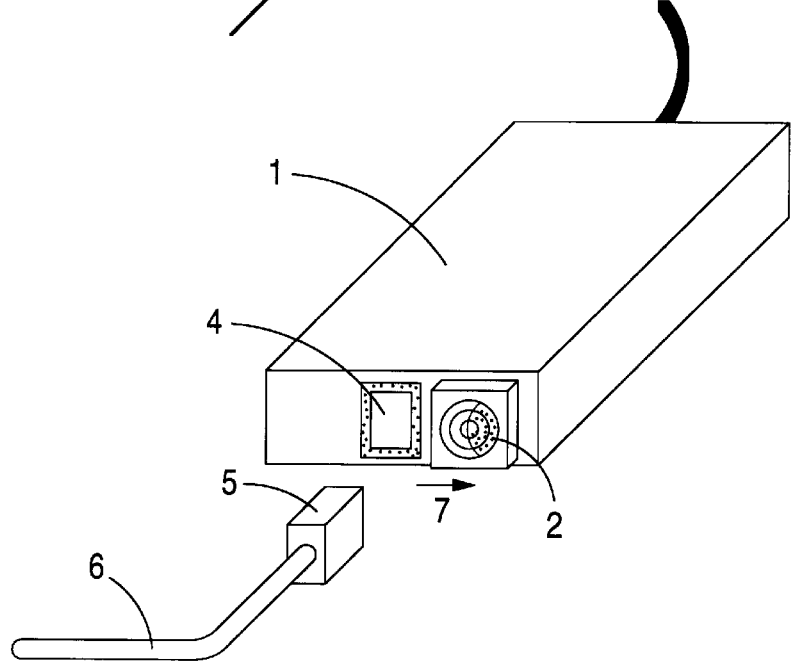
FIG. 1B is a perspective view showing the optical transceiver of the first embodiment in a state that it is used for optical fiber transmission.
Figure 1C:
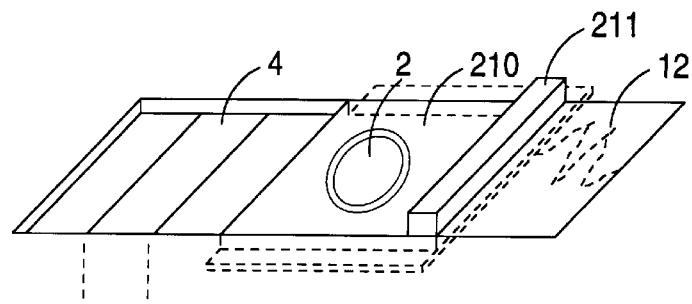
FIG. 1C is an enlarged perspective view showing a mechanism for switching between free space light and an optical fiber.

FIGS. 1A–1C are perspective views showing an optical transceiver according to a first embodiment of the present invention. A movable lens 2 is provided on one side face of a casing of an optical transceiver 1, to allow for a communication by means of free space light 3 as shown in FIG. 1A. If the lens 2 is moved in direction 7 and an optical plug 5 is fitted in an optical jack 4 as shown in FIG. 1B, it becomes possible to conduct a communication via an optical fiber cable 6. FIG. 1C is an enlarged perspective view showing only a mechanism for switching between free space light and an optical fiber. The lens 2 is mounted on a base 210. The base 210 is provided with a knob 211 for hooking by a finger. Extended below the openings the base 210 is adapted to be movable horizontally along guide rails (not shown).

FIGS. 2A and 2B are schematic sectional views showing an internal configuration of the optical transceiver 1 of FIG. 1A–1C. FIGS. 2A and 2B correspond to FIGS. 1A and 1B, respectively. As shown in FIGS. 1A and 2A, in the free space transmission state, light emitted from a light-emitting element 8, which is driven by a driving circuit 10, is sent out to the free space via the lens 2. And light that comes externally being propagated through the free space is received by a photodetecting element 9 via the lens 2. An input electrical signal 20, which is externally input to the optical transceiver 1, is supplied to the driving circuit 10. An amplifier 11 amplifies a signal that is produced by the photodetecting element 9 by photoelectric conversion, and an amplified electrical signal 21 is output from the optical transceiver 1.

Figure 6A:
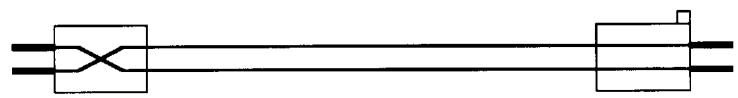
FIGS. 6A–6E show configurations of optical fiber cables that can be used in combination with the optical transceivers of the invention.

On the other hand, as shown in FIGS. 1B and 2B, in the optical fiber transmission state, the light-emitting element 8 and the photodetecting element 9 are optically coupled to the optical fiber cable 6 via the optical plug 5. The optical fiber cable 6 has a structure that two optical fibers are bundled as shown in FIG. 6A.

Urged by an elastic body 12, the lens 2 is automatically restored to the original position upon removal of the optical plug 5. Thus, the lens 2 also serves as a protection cap for the light-emitting element 8 and the photodetecting element 9. The elastic member 12 is constituted by a spring or the like.

As described above, the optical transceiver 1 of this embodiment can be used for both of free space communication and optical fiber communication, because it is provided with the optical jack 4 such that the light-emitting element 8 and the photodetecting element 9 are located behind the movable lens 2. The optical transceiver 1 has an advantage of a simple structure. It is noted that the lens 2 may be replaced by an optical coupling means such as a diffraction grating or a hologram.

Embodiment 2

Optical transceiver

Figure 6B:
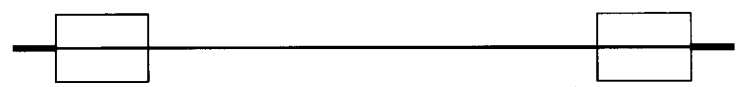

FIGS. 3A and 3B are schematic sectional views showing an internal configuration of an optical transceiver according to a second embodiment of the invention. This embodiment is different, in internal configuration, from the first embodiment in that the light-emitting element 8 and the photodetecting element 9 are optically coupled to a single optical fiber 6b via an optical coupler 13. As shown in FIG. 6B, the optical fiber cable 6b is constituted of a single optical fiber. In the free space communication, coupling to the free space is effected also via the optical coupler 13.

This embodiment is advantageous over the first embodiment in that the number of optical fibers necessary for the optical fiber transmission is halved.

Embodiment 3

Optical transceiver

Figure 4A:
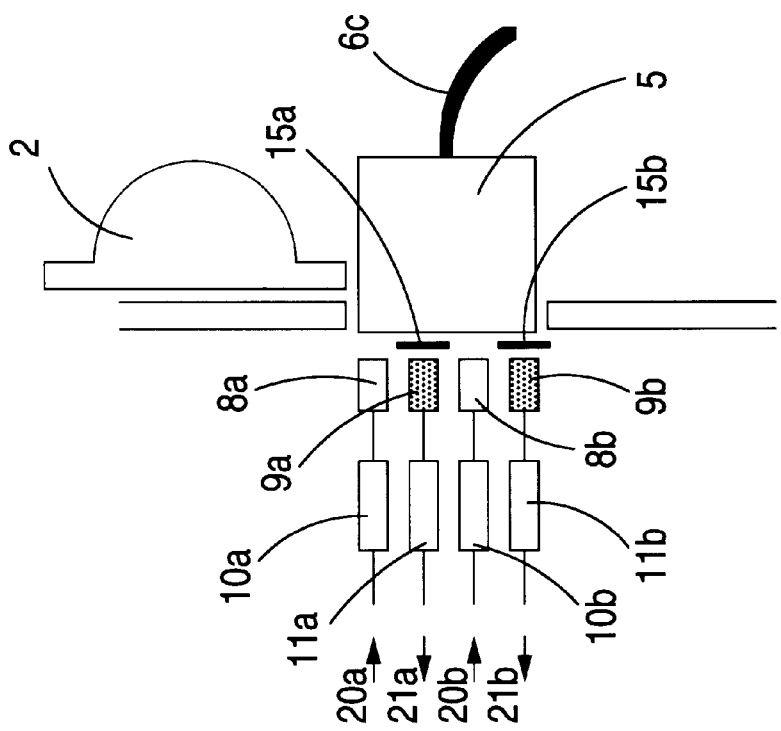
FIGS. 4A and 4B are schematic sectional views showing an internal configuration of an optical transceiver according to a third embodiment of the invention and corresponding to a free space transmission state and an optical fiber transmission state, respectively.
Figure 4B:
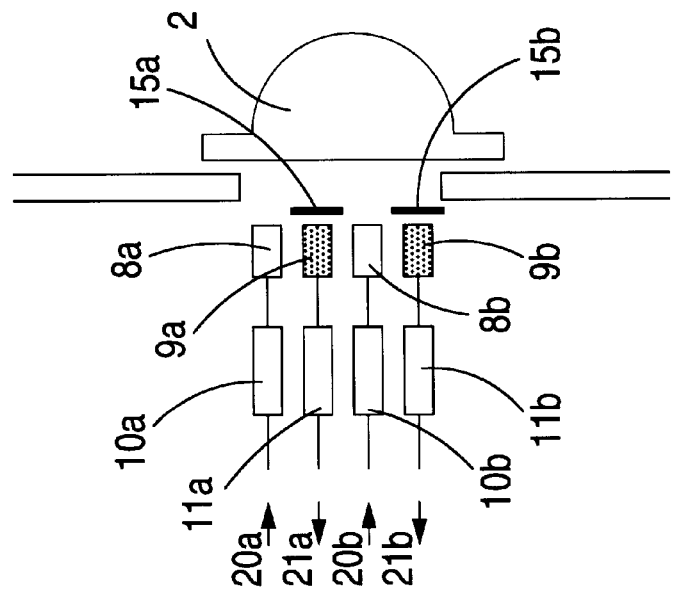

FIGS. 4A and 4B are schematic sectional views showing an internal configuration of an optical transceiver according to a third embodiment of the invention. In this embodiment, two-channel wavelength multiplexing is performed. Light-emitting diodes 8a and 8b are superluminescent diodes having respective emission wavelengths of 780 nm and 650 nm, for instance. Interference filters 15a and 15b covers respective photodetecting elements 9a and 9b. Reference symbols 20a and 20b denote electrical signals that are externally input to the optical transceiver, and symbols 21a and 21b denote output electrical signals to be transmitted from the optical transceiver.

Figure 6C:
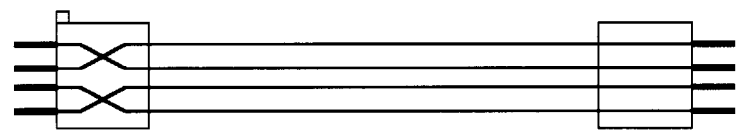

The optical transceiver of this embodiment is used in combination with an optical fiber cable in which four optical fibers are bundled as shown in FIG. 6C.

This embodiment is advantageous in that the number of transmission channels is increased by virtue of the wavelength multiplexing.

Embodiment 4

Optical transceiver

Figure 5B:
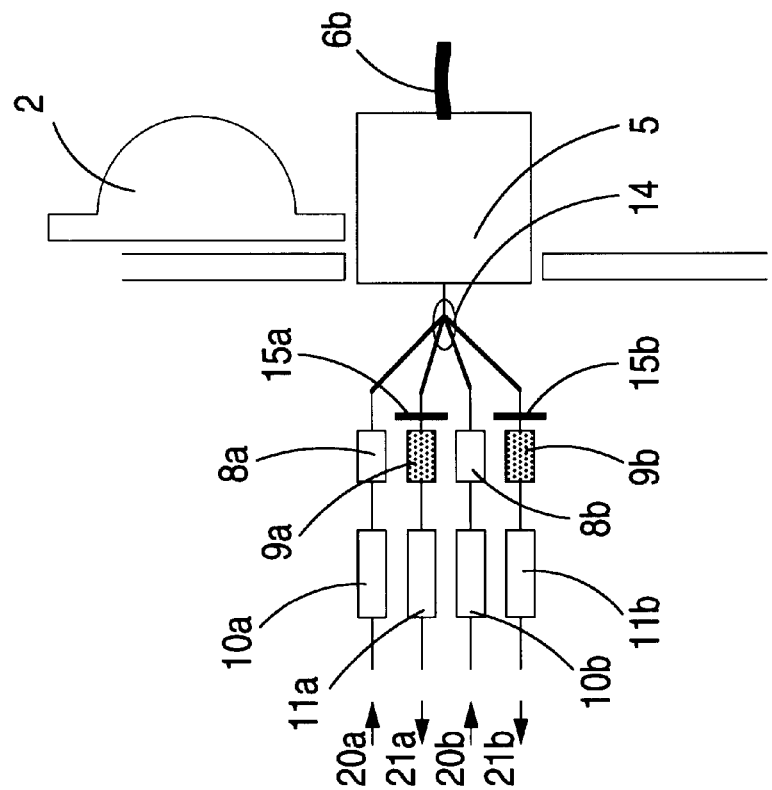
FIGS. 5A and 5B are schematic sectional views showing an internal configuration of an optical transceiver according to a fourth embodiment of the invention and corresponding to a free space transmission state and an optical fiber transmission state, respectively.
Figure 5A:
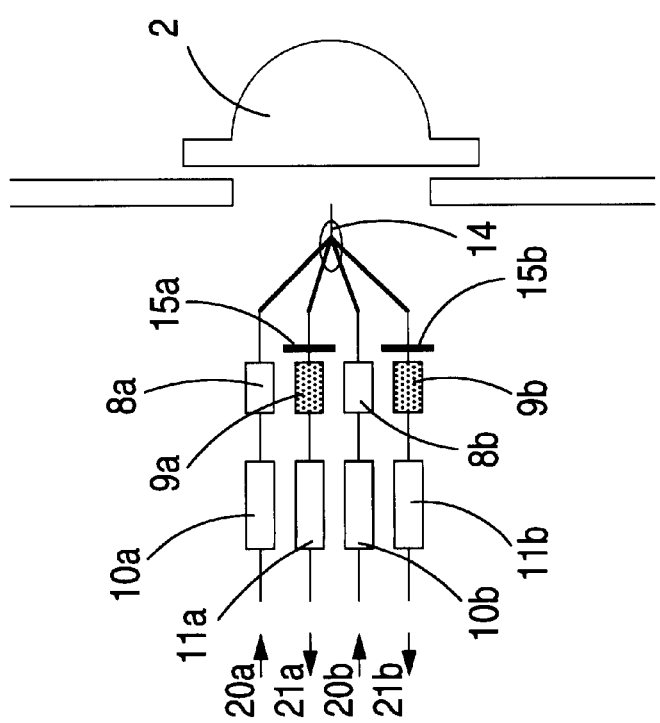

FIGS. 5A and 5B are schematic sectional views showing an internal configuration of an optical transceiver according to a fourth embodiment of the invention. In this embodiment, two-channel wavelength multiplexing is performed as in the third embodiment. This embodiment is different from the third embodiment in that the light-emitting elements 8a and 8b and the photodetecting elements 9a and 9b are optically coupled to a single optical fiber 6b via an optical coupler 14. In the free space communication, coupling to the free space is effected also via the optical coupler 14. Reference symbols 20a and 20b denote electrical signals that are externally input to the optical transceiver, and symbols 21a and 21b denote output electrical signals to be transmitted from the optical transceiver.

The optical transceiver of this embodiment can be used in combination with the optical fiber cable shown in FIG. 6B.

Like the third embodiment, this embodiment is advantageous in that the number of transmission channels is increased by the wavelength multiplexing. In addition, this embodiment is advantageous over the third embodiment in that the number of optical fibers necessary for the optical fiber transmission is quartered.

Examples of optical fiber cables

Figure 6D:
Figure 6E:

FIGS. 6A–6E show examples of optical cables that can be used in combination with the optical transceivers of the invention. FIG. 6A shows an optical fiber cable in which two optical fibers are bundled, which is used in combination with the optical transceiver of the first embodiment. FIG. 6B shows an optical fiber cable that is constituted of a single optical fiber, which is used in combination with the optical transceiver of the second embodiment. FIG. 6C shows an optical fiber cable in which four optical fibers are bundled, and is used in combination with the optical transceiver of the third embodiment. FIG. 6D shows an optical fiber cable in which an optical coupler 13 is incorporated in each optical plug, and can be used in combination with the optical transceiver of the first embodiment. FIG. 6E shows an optical fiber cable in which an optical coupler 14 is incorporated in each optical plug, and can be used in combination with the optical transceiver of the third embodiment.

Figure 7:
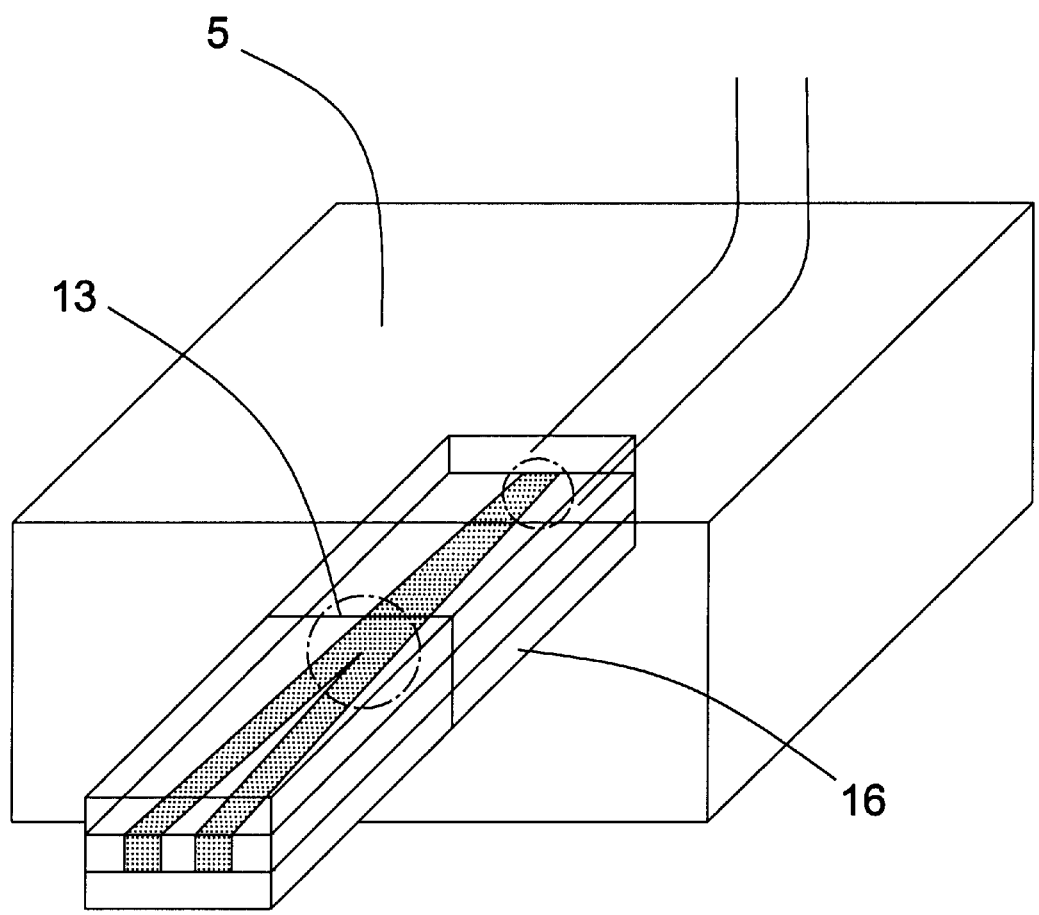
FIG. 7 is a perspective view showing the structure of an optical plug of the optical fiber cable shown in FIG. 6D.

FIG. 7 is a perspective view showing the structure of the optical plug 5 of the optical fiber cable shown in FIG. 6D. The optical coupler 13 is formed in the parallel plate waveguide substrate 16. The parallel plate waveguide substrate 16 is produced by known manufacturing methods of a plastic waveguide and a glass waveguide.

Embodiment 5

Optical transceiver

Figure 8A:
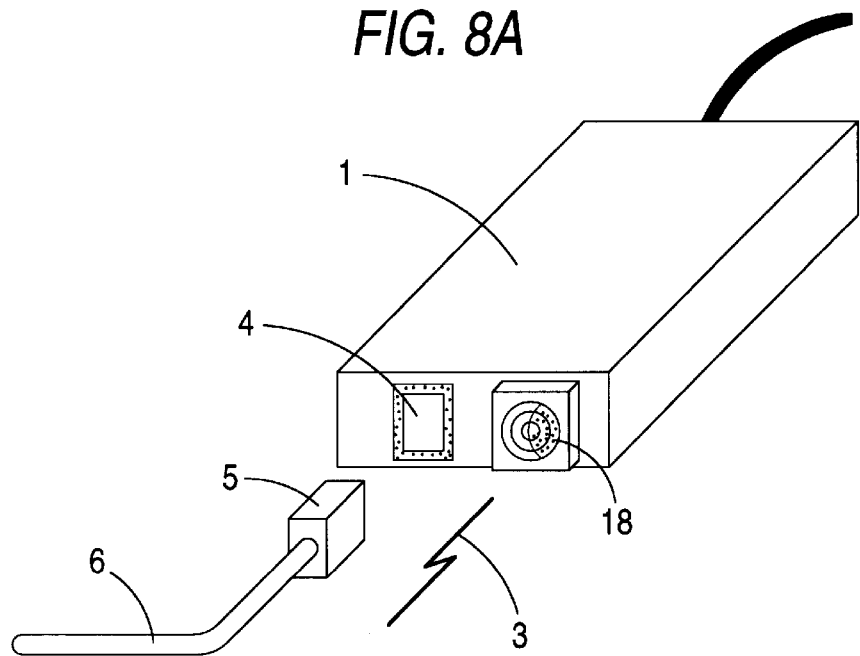
FIG. 8A is a perspective view of an optical transceiver according to a fifth embodiment of the invention.
Figure 8B:
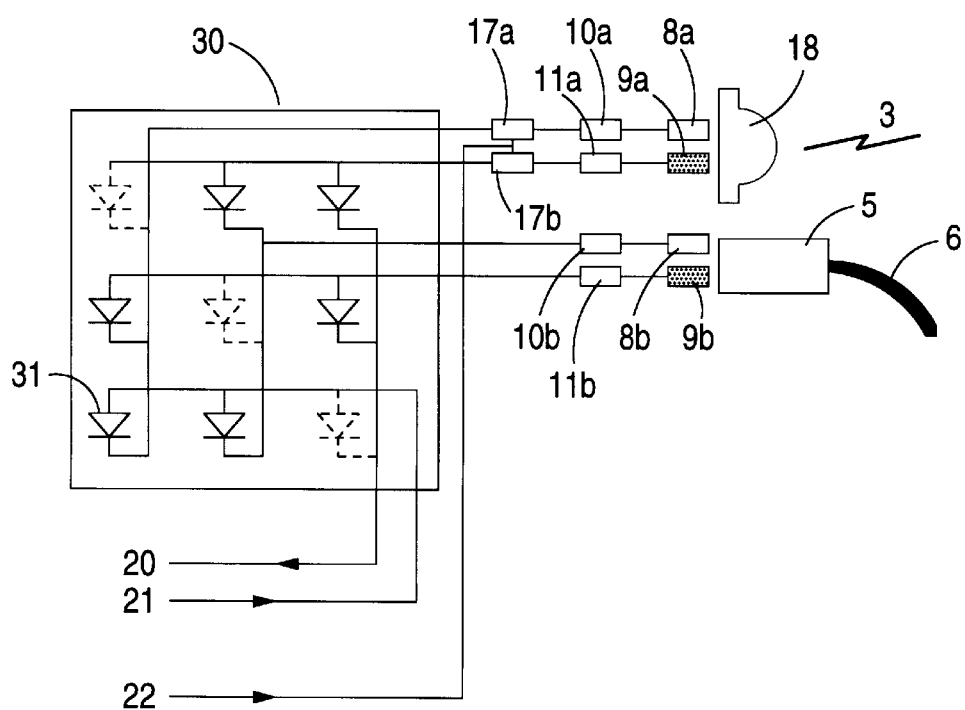
FIG. 8B is a circuit diagram showing an internal configuration of the optical transceiver of FIG. 8A.

FIGS. 8A and 8B show an optical transceiver according to a fifth embodiment of the invention FIG. 8A is a perspective view of an optical transceiver 1, and FIG. 8B is a circuit diagram showing its internal configuration. In this embodiment, a fixed lens 18 is used rather than the movable lens 2, and disposed separately from the optical jack 4. Interface with a free space optical signal or an optical signal coming or transmitted through an optical fiber cable 6 is effected via an electrical circuit provided in the optical transceiver 1.

As shown in FIG. 8B, optical transmission by means of free space light is performed by a light-emitting element 8a, its driving circuit 10a, a photodetecting element 9a, and an amplifier 11a of an electrical signal that is output from the photodetecting element 9a. Optical transmission via the optical fiber cable 6 is performed by a light-emitting element 8b, its driving circuit 10b, and an amplifier 11b of an electrical signal that is output from the photodetecting element 9b. The optical transmission system of free space light, the optical transmission system via the optical fiber cable 6, and the external transmission system of electrical signals are interfaced with each other by a matrix circuit 30 having a transfer matrix of zero diagonal components.

The matrix circuit 30 having a transfer matrix of zero diagonal components provides the following interface between transmission signals. An input signal of free space light produces an optical signal to the optical fiber cable 6 and an electrical signal to the external system. An input signal from the optical fiber cable 6 produces an optical signal of free space light and an electrical signal to the external system. An electrical signal from the external system produces an optical signal of free space light and an optical signal to the optical fiber cable 6. That is, the optical transceiver 1 of this embodiment functions as an interface between the free space transmission system, the optical fiber cable transmission system, and the electrical signal transmission system.

The configuration and the function of the matrix circuit 30 having a transfer matrix of zero diagonal components are known from Japanese Unexamined Patent Publication No. Hei. 3-296332. By virtue of a transfer matrix of zero diagonal components, a star coupler using this type of matrix circuit has no signal transfer between a receiver and a transmitter in a single transmission system (optical transceiver). Even if a plurality of such star couplers are connected to construct an optical communications network, there occurs no oscillation or ghost.

Gates 17a and 17b control the link between the free space and the optical transceiver 1 based on a gate signal 22. the gates 17a and 17b a control means for preventing interference between a plurality of optical transmitters which would otherwise occur when they are disposed adjacent to each other.

Although the optical transceiver of this embodiment has a more complex configuration than that of the first embodiment, the former is more reliable than the latter because of no need for providing a lens moving mechanism. Further, the light-emitting elements 8a and 8b can have different emission wavelengths. This enables a design that an eye-safe wavelength is used for the transmission through a free space and a wavelength in a low-loss band of optical fibers may be used for the transmission via an optical fiber cable.

Embodiment 6
Optical transceiver

Figure 9:
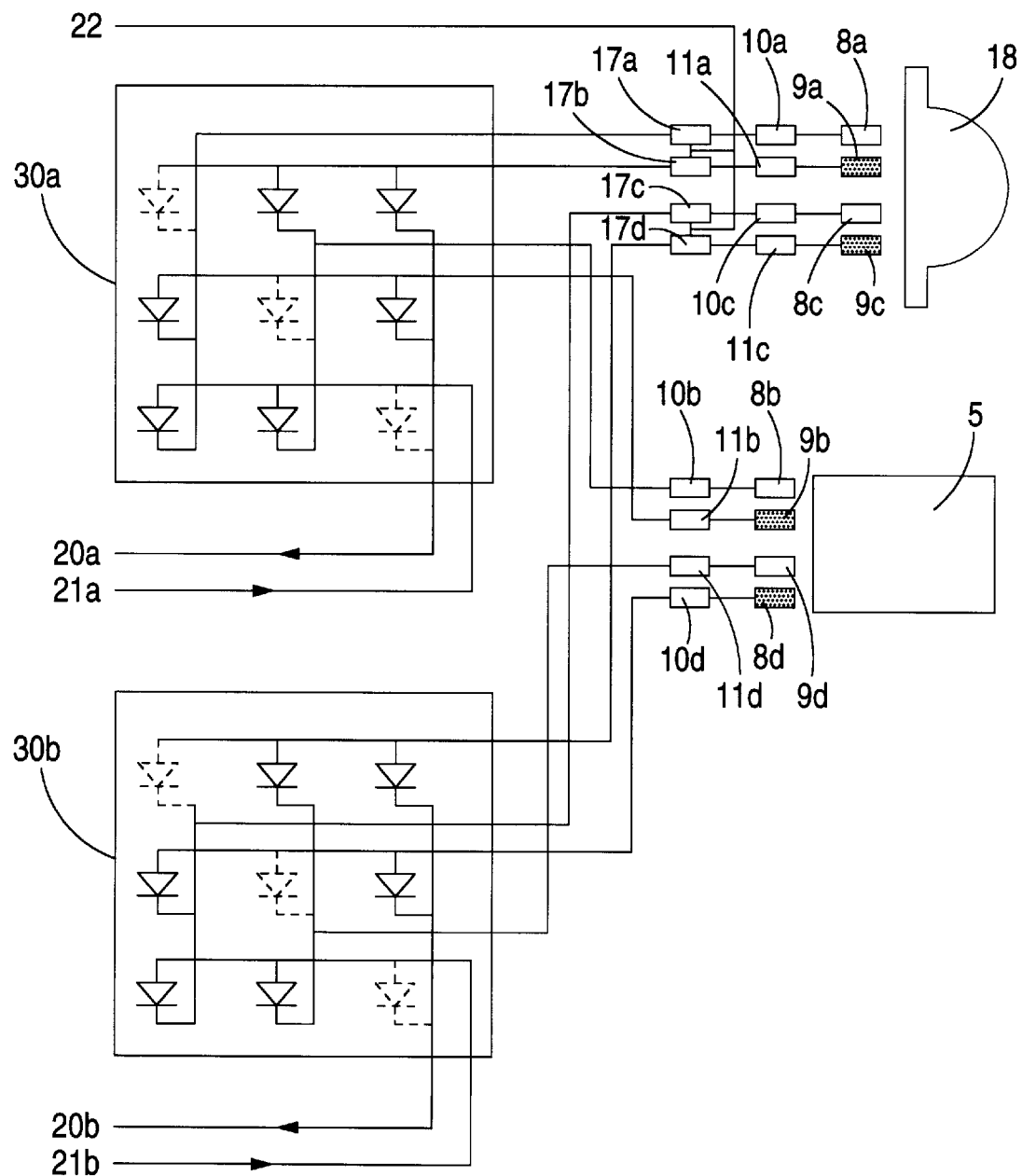
FIG. 9 is a circuit diagram showing an internal configuration of an optical transceiver according to a sixth embodiment of the invention.

FIG. 9 is a circuit diagram showing an internal configuration of an optical transceiver according to a sixth embodiment of the invention. The optical transceiver of this embodiment has the same appearance as that of the fifth embodiment (see FIG. 8A). Two-channel wavelength multiplexing is performed in this embodiment as in the case of the third and fourth embodiments. Free space transmission is performed by a fixed lens 18, light-emitting elements 8a and 8c, their driving circuits 10a and 10c, photodetecting elements 9a and 9c, and amplifiers 11a and 11c of electrical signals that are output from the photodetecting elements 9a and 9c. Optical fiber transmission is performed by light-emitting elements 8b and 8d, their driving circuits 10b and 10d, and amplifiers 11b and 11d of electrical signals that are output from the photodetecting elements 9b and 9d. Provided with matrix circuits 30a and 30b each having zero diagonal components, the optical transceiver of this embodiment functions as an interface between the free space transmission system, the optical fiber cable transmission system, and the electrical signal transmission system for each of the two wavelength-multiplexed channels.

This embodiment is advantageous over the fifth embodiment in that the number of transmission channels is increased by virtue of the wavelength multiplexing.

Embodiment 7
Optical transceiver

Figure 10A:
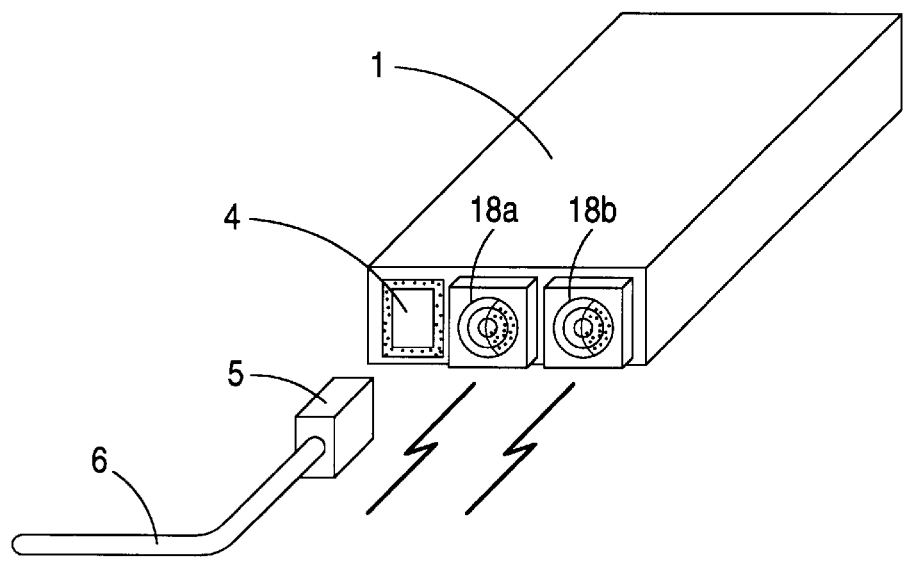
FIG. 10A is a perspective view of an optical transceiver according to a seventh embodiment of the invention.
Figure 10B:
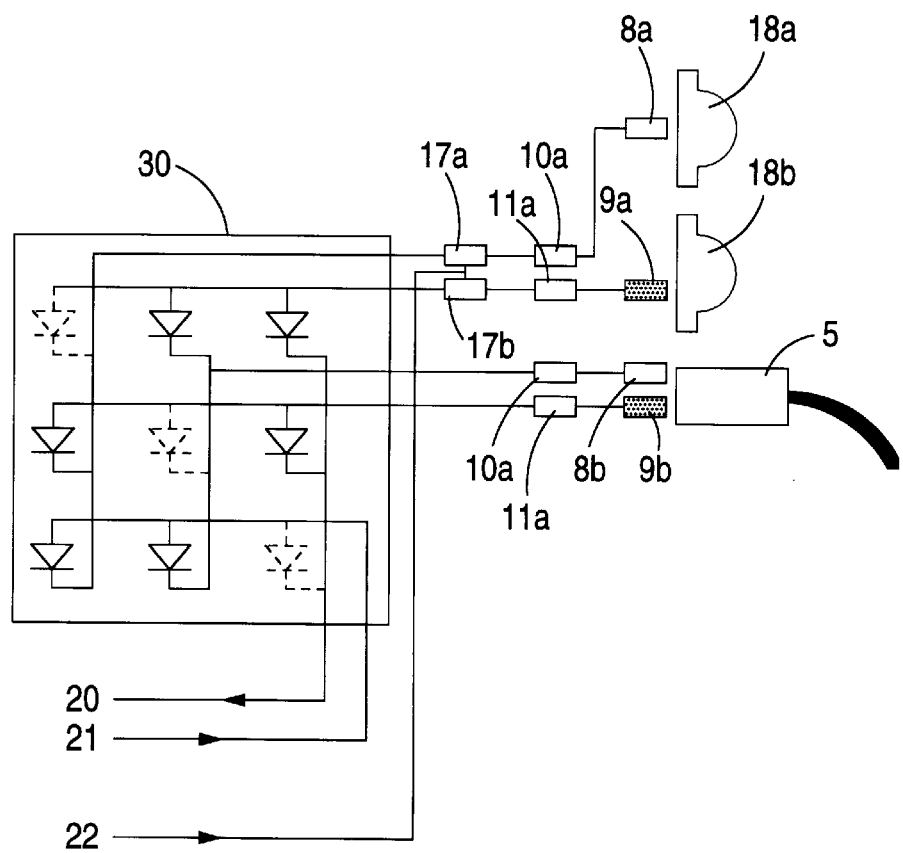
FIG. 10B is a circuit diagram showing an internal configuration of the optical transceiver of FIG. 10A.

FIG. 10A is a perspective view showing an optical transceiver according to a seventh embodiment of the invention, and FIG. 10B is a circuit diagram showing its internal configuration. This embodiment has a feature that two fixed lenses 18a and 18b are provided which are dedicated to the output and input of the free space transmission, respectively.

Because the lens is shared by the transmission side and the receiving side, the optical transceivers of the first to sixth embodiments have a problem that during a transmitting operation part of transmission light is reflected by the lens and enters the photodetecting element. This problem is solved by this embodiment because of the separation of the lenses for the output and input of the free space transmission.

Embodiment 8
Optical transceiver

Figure 11:
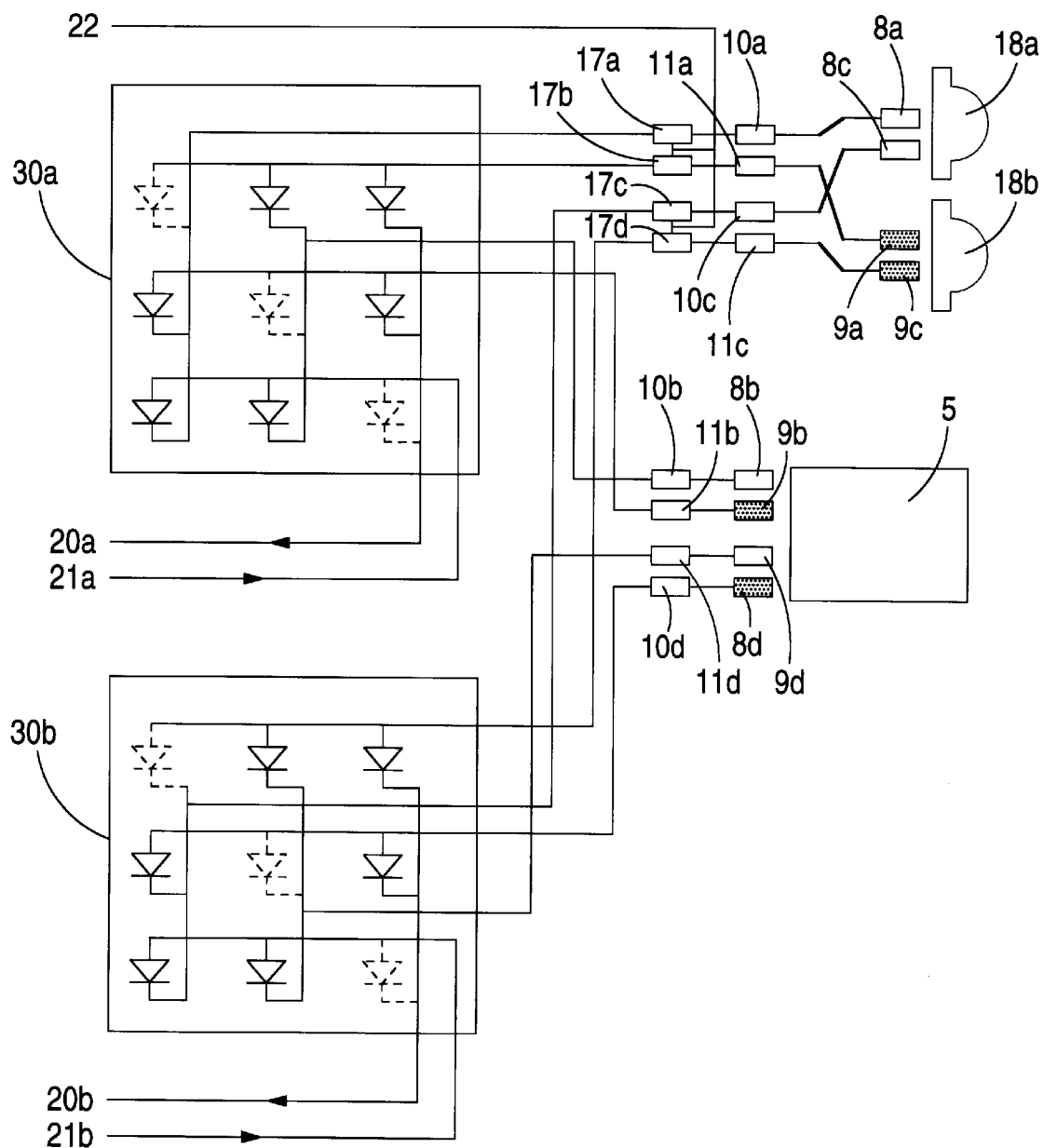
FIG. 11 is a circuit diagram showing an internal configuration of an optical transceiver according to an eighth embodiment of the invention.

FIG. 11 is a circuit diagram showing an internal configuration of an optical transceiver according to an eighth embodiment of the invention. In addition to the configuration of the seventh embodiment, this embodiment has a feature that two-channel wavelength multiplexing is performed as in the case of the sixth embodiment.

This embodiment is advantageous over the seventh embodiment in that the number of transmission channels is increased by virtue of the wavelength multiplexing. Further, this embodiment is advantageous over the sixth embodiment in being free of the problem that during a transmitting operation part of transmission light is reflected by the lens and enters the photodetecting element.

Embodiment 9
Optical communications network

Figure 12A:
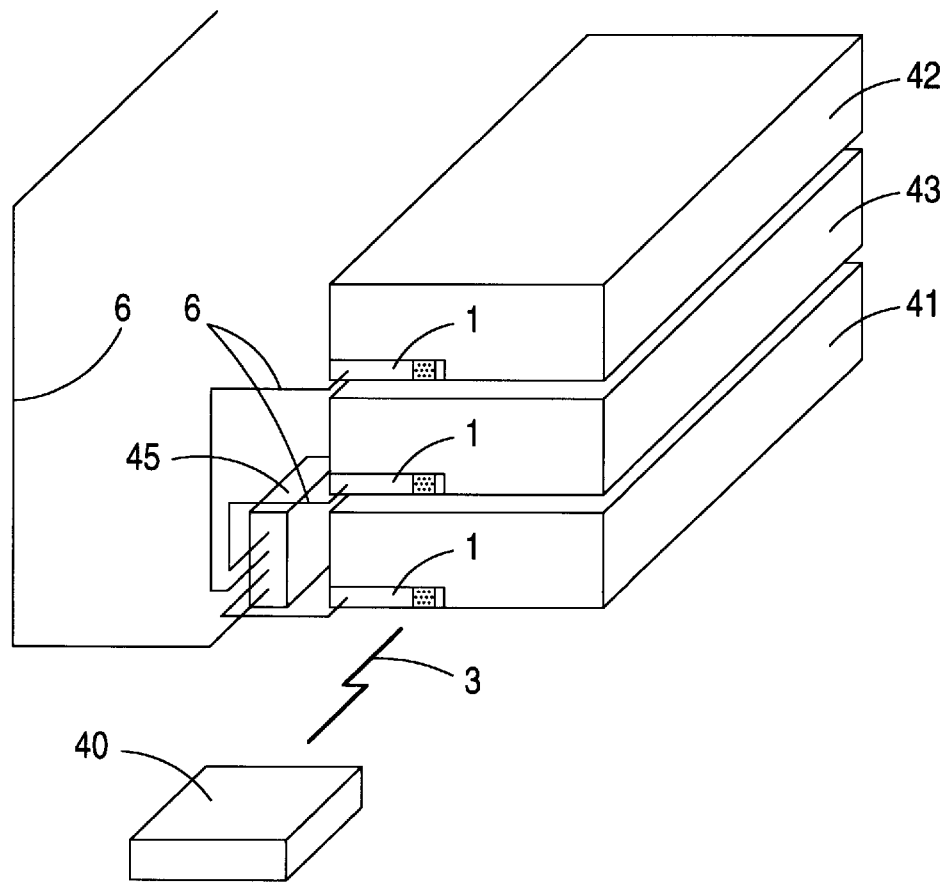
FIG. 12A is a perspective view of an optical communications network according to a ninth embodiment of the invention.
Figure 12B:
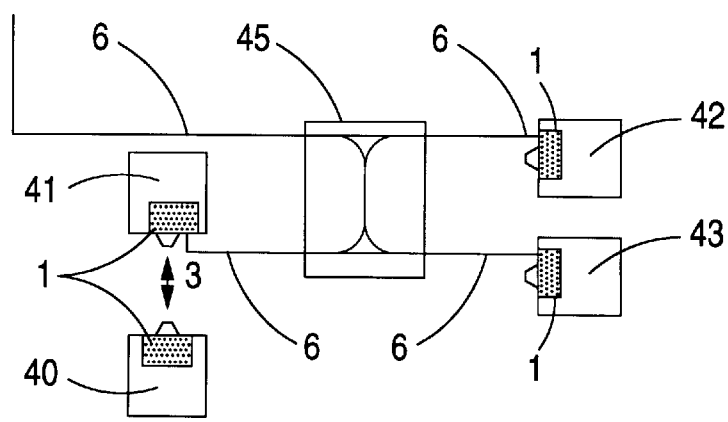
FIG. 12B is a circuit diagram showing how components are connected to each other in the network of FIG. 12A.

FIG. 12A is a perspective view showing an optical communications network according to a ninth embodiment of the invention. The optical transceiver 1 according to the fifth embodiment of the invention is incorporated in each of a notebook-sized personal computer 40 and peripheral devices 41–43. The personal computer 40 and the peripheral device 41 are linked to each other by means of free space light 3. The peripheral devices 41–43 are linked to an optical fiber cable 6 via a four-terminal, interconnectable passive star coupler 45. FIG. 12B is a circuit diagram showing how the components of the optical communications network are connected to each other. The interconnectable passive star coupler 45 has a transfer matrix in which all the diagonal elements are zero. Therefore, an optical signal that has been input to one terminal is distributed to the other terminals and transmitted therefrom, but is not distributed to the terminal to which the optical signal concerned has been input. For example, in the network configuration of FIG. 12B, an optical signal that has been transmitted from the station 42 to the optical fiber transmission path 6 are distributed to the stations 41 and 43 via the star coupler 45, but does not return to the station 42 itself.

The four-terminal, interconnectable, passive star coupler 45 is known from Japanese Unexamined Patent Publication No. Hei. 5-3457.

Figure 13A:
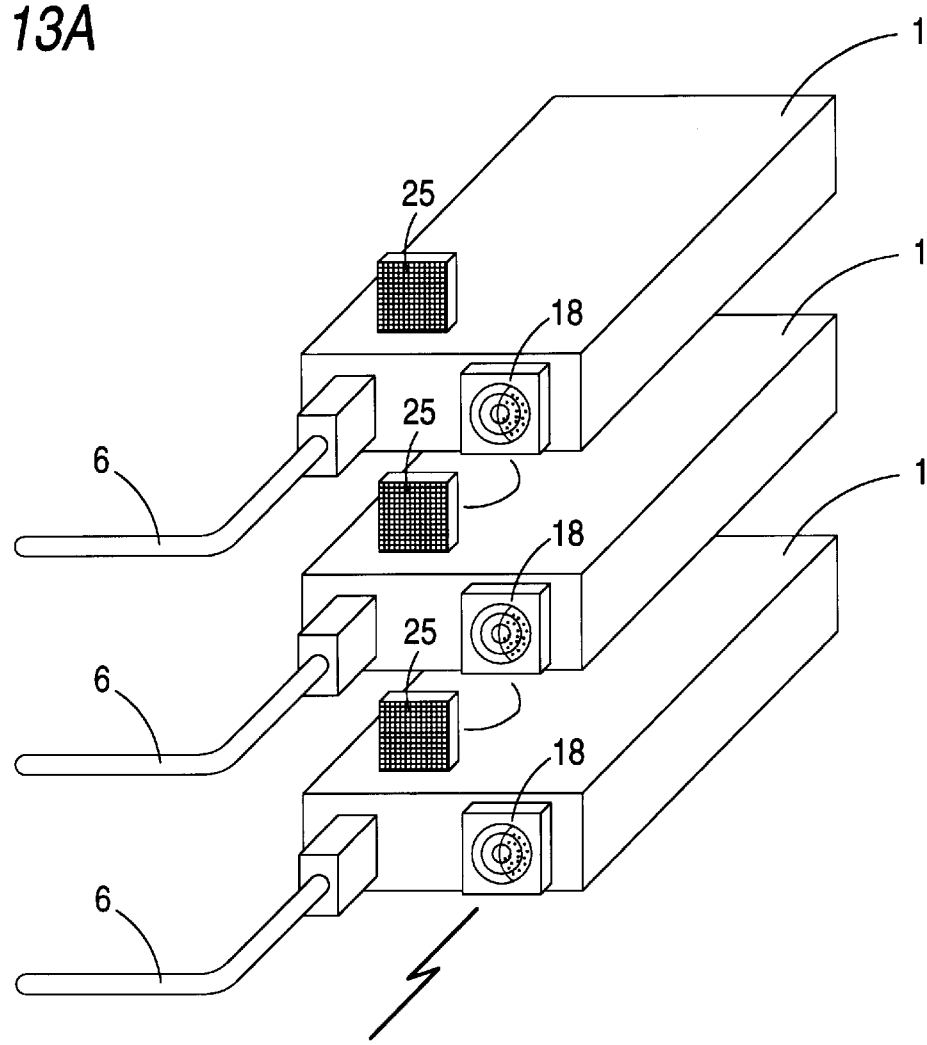
FIG. 13A is an enlarged view of the main part of the optical communications network of FIG. 12A.

FIG. 13A is an enlarged view of the main part of the optical communications network of FIG. 12A. Caps 25 are attached to fixed lenses 18 of the peripheral devices 42 and 43 which lenses are to be used for free space optical transmission and reception. This is to prevent occurrence of multiple paths of free space light due to close arrangement of the peripheral devices 41–43. Even without using the caps 25, the occurrence of multiple paths can also be prevented by electrically closing the gates 17a and 17b by using the gate signal 22 (see FIG. 8B).

Figure 13B:
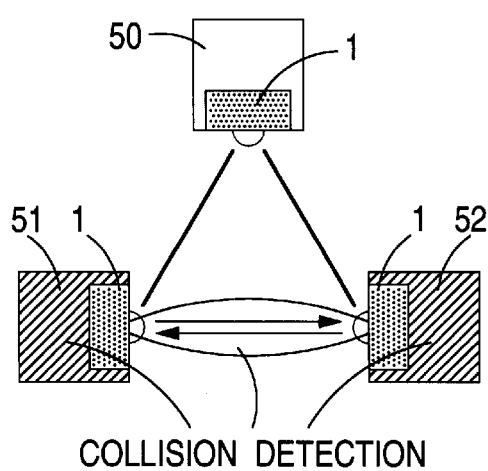
FIG. 13B schematically illustrates the principle of collision detection by carrier sensing in a case where free space transmission is performed in the optical communications network of FIG. 12A.

FIG. 13B schematically illustrates the principle of collision detection by carrier sensing in a case where free space transmission is performed in the optical communications network of this embodiment. FIG. 13B shows a case where terminal stations each having the optical transceiver 1 of the fifth embodiment are linked to each other via the free space.

Since a bi-directional communication can be performed in free space optical transmission, it is possible to monitor a reception port of the self station during signal transmission. By utilizing this feature, the terminal stations 50–51 may employ a protocol in which a terminal station judges that a collision has occurred upon reception of a certain signal during its own transmitting operation. For example, in the example of FIG. 13B, since both terminal stations 51 and 52 are transmitting signals, they judge that a collision has occurred and perform collision processing.

Figure 14A:
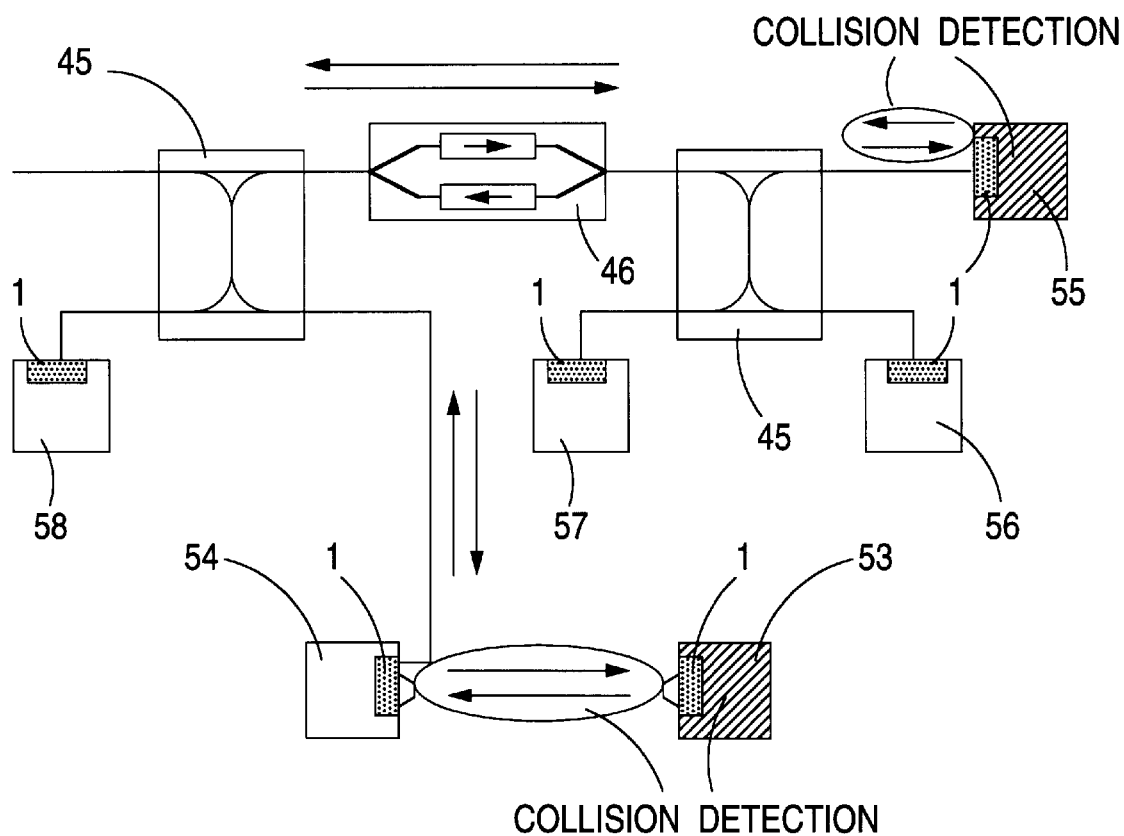
FIG. 14A schematically illustrates the principle of collision detection by carrier sensing in the optical communications network of FIG. 12A.

FIG. 14A, which is circuit diagram as a detailed version of FIG. 12B, schematically shows the principle of collision detection by carrier sensing of the optical communications network of this embodiment. This network has a plurality of 4-terminal, interconnectable, passive star couplers 45. A bi-directional optical relay amplifier 45 is provided between the interconnectable star couplers 45. Since this type of network is bi-directional like a free space, it can employ a protocol in which a terminal station judges that a collision has occurred upon reception of a certain signal during its own transmitting operation.

The collision detecting method by carrier sensing in a bi-directional optical fiber network is known from a paper by T. Tamura et al., "Optical Cascade Star Network—A New Configuration for a Passive Distribution System with Optical Collision Detection Capability," Journal of Lightwave Technology, Vol. LT-1, No. 1, pp. 61–66, 1984 and Japanese Unexamined Patent Publication No. Hei. 3-296332. However, there is no conventional technique in which the collision detecting method with carrier sensing is applied to a network using free space transmission or both of free space transmission and optical fiber transmission.

In the example of FIG. 14A, a terminal station 53 in a free space transmission mode and a terminal station 55 connected to the optical fiber network are transmitting signals at the same time. Since the terminal stations 53 and 55 receive optical signals during the transmitting operations, they can detect a collision.

Figure 14B:
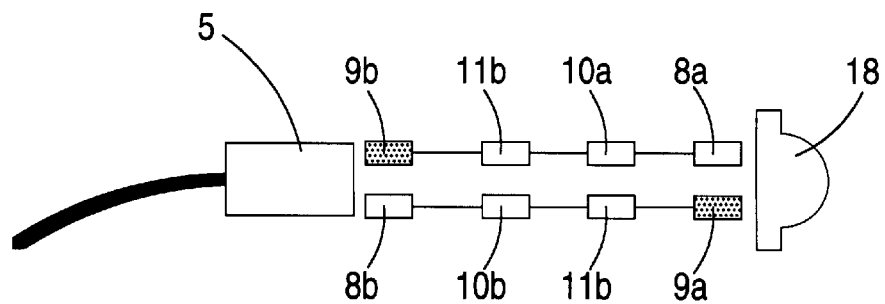
FIG. 14B shows an internal configuration of an optical transceiver which performs only exchange of an optical signal between an optical fiber cable and a free space.

In FIG. 14A, each of the terminal stations 53–58 incorporates the optical transceiver 1 of the fifth embodiment. Alternatively, the terminal station 54 may be equipped with an optical transceiver that has the chassis of FIG. 8A and an internal circuit configuration of FIG. 14B. This optical transceiver merely exchanges an optical signal between the optical fiber cable and the free space and does not exchange a signal with any electrical signal transmission system.

Figure 15:
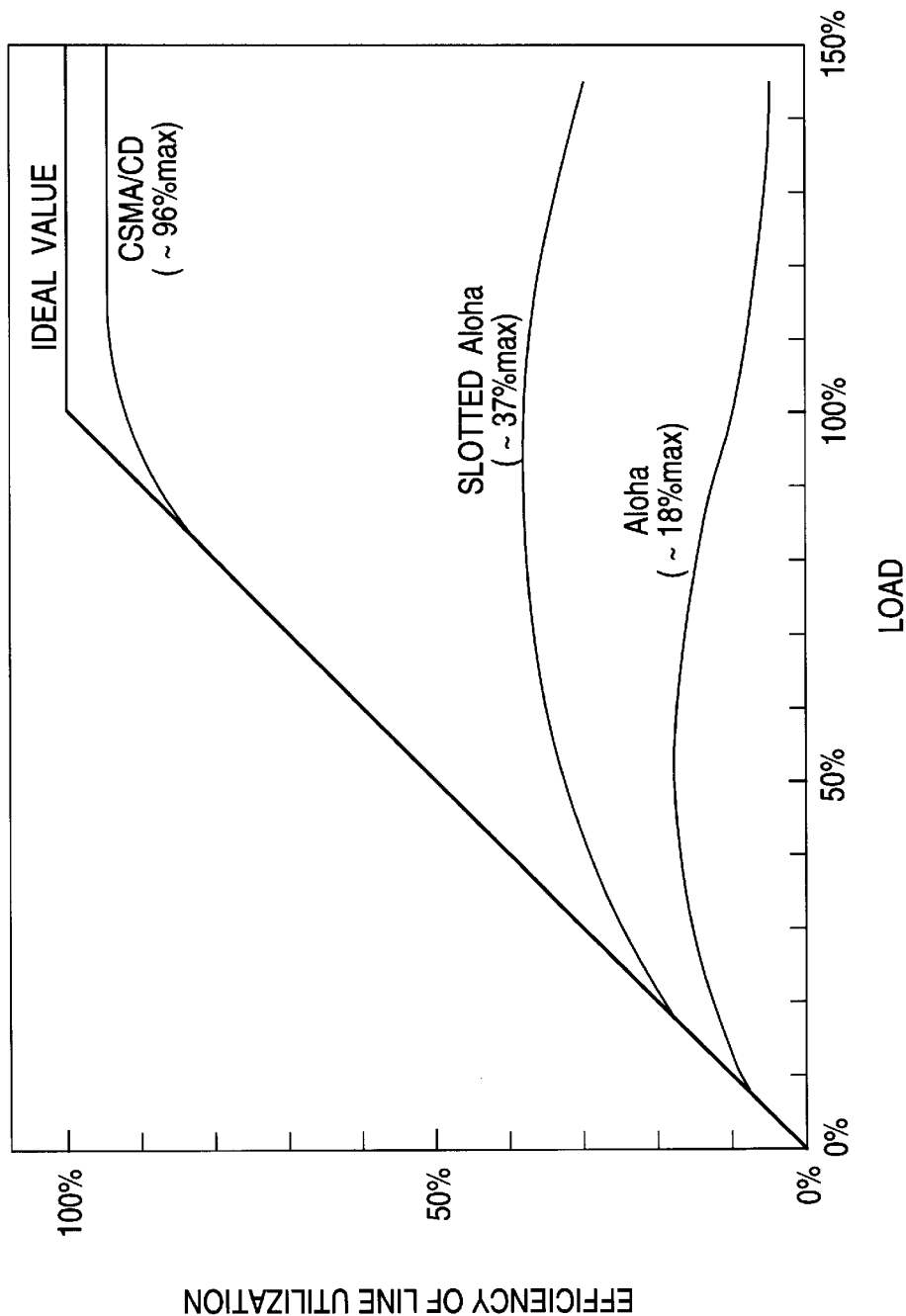
FIG. 15 is a graph showing the efficiency of line utilization of various contention-type protocols.

FIG. 15 is a known graph showing the efficiency of line utilization, in a broadcast bus type network, of what is called contention-type protocols in which the network is occupied by a first-access station (cited from J. F. Shoch et al.: "Measured Performance of an Ethernet Local Network," Communications of the ACME Vol. 23, No. 12, pp. 711–720, 1980). "Aloha" is a contention type protocol of a case where radio waves are used and collision detection is not performed. In this protocol, the efficiency of line utilization is low, that is, 18% at the maximum. In contrast, in the case of CSMA/CD (carrier sense multiple access/collision detection) which performed collision detection, the efficiency of line utilization has a maximum value of 96%. This large value is mainly owing to the collision detection. Usually, the free space transmission employs the Aloha protocol. However, this embodiment can employ CSMA/CD which performs collision detection, because the collision detection by carrier sensing can be performed in the embodiment. This provides a further advantage that a common protocol can be employed for the free space transmission and the optical fiber transmission.

Embodiment 10
Optical communications network

Figure 16:
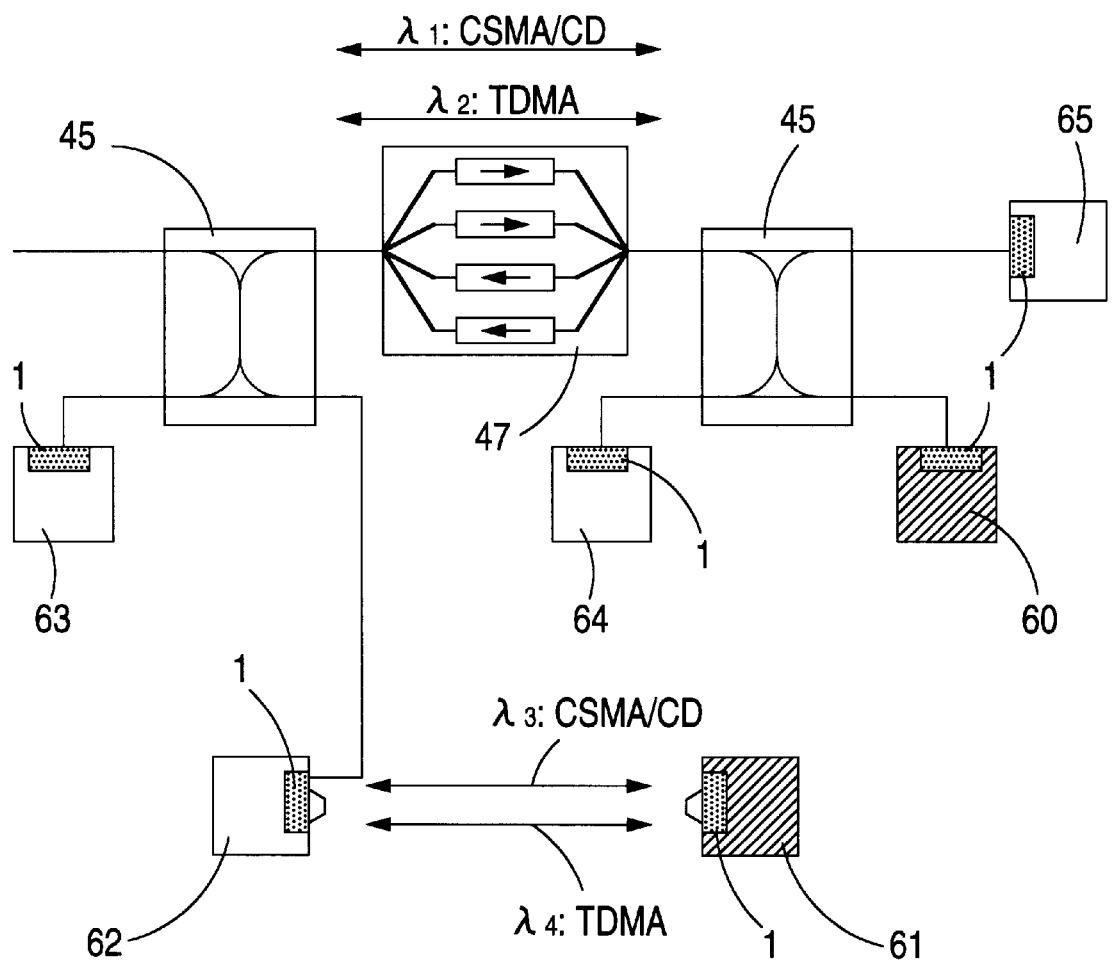
FIG. 16 is a circuit diagram of an optical communications network according to a tenth embodiment of the invention.

FIG. 16 is a circuit diagram showing an optical communications network according to a tenth embodiment of the invention. This optical communications network is different from that of the first embodiment (FIG. 14A) in that wavelength-multiplexed optical transmitters 1 are used, and that a wavelength-multiplexed, bi-directional optical relay amplifier 47 is provided between the interconnectable star couplers 45. This configuration realizes a 2-channel, wavelength-multiplexed broadcast bus system. The optical communications network is so constructed that in the optical fiber network the channel of wavelength $\lambda_1$ complies with the CSMA/CD protocol and the channel of wavelength $\lambda_2$ complies with the TDMA (time division multiple access) protocols and that in the free space transmission the channel of wavelength $\lambda_3$ complies with the CSMA/CD protocol and the channel of wavelength $\lambda_4$ complies with the TDMA (time division multiple access) protocol.

The optical transceiver 1 is so constructed that an optical signal of wavelength $\lambda_1$ transmitted through the optical fiber network is converted into an optical signal of wavelength $\lambda_3$ and sent out to the free space, and that, conversely, an optical signal transmitted through the free space is converted into an optical signal of wavelength $\lambda_3$ and sent out to the optical fiber network. Similarly, the optical transceiver 1 is so constructed that an optical signal of wavelength $\lambda_2$ transmitted through the optical fiber network is converted into an optical signal of wavelength $\lambda_4$ and sent out to the free space, and that, conversely, an optical signal transmitted through the free space is converted into an optical signal of wavelength $\lambda_2$ and sent out to the optical fiber network. It may occur a case that wavelengths $\lambda_1$ and $\lambda_3$ are identical, or wavelengths $\lambda_2$ and $\lambda_4$ are identical (described later).

Figure 17:
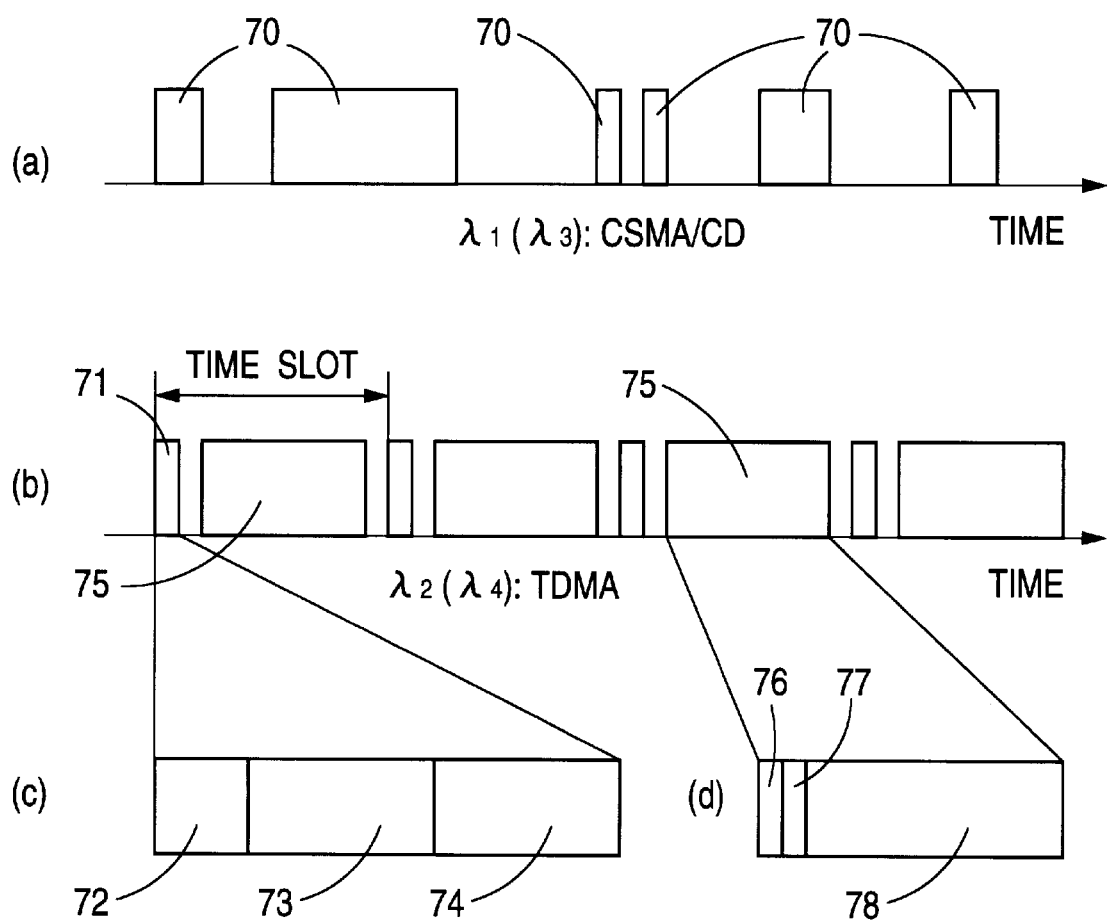
FIG. 17 is a timing chart showing the operation of the optical communications network of FIG. 16.

FIG. 17 is a timing chart showing the operation of the optical communications network of this embodiment. Part (a) of FIG. 17 is a timing chart of the CSMA/CD protocol channel of wavelength $\lambda_1$ or $\lambda_3$, and shows a traffic example in which packets 70 of various lengths flow randomly.

Figure 18:
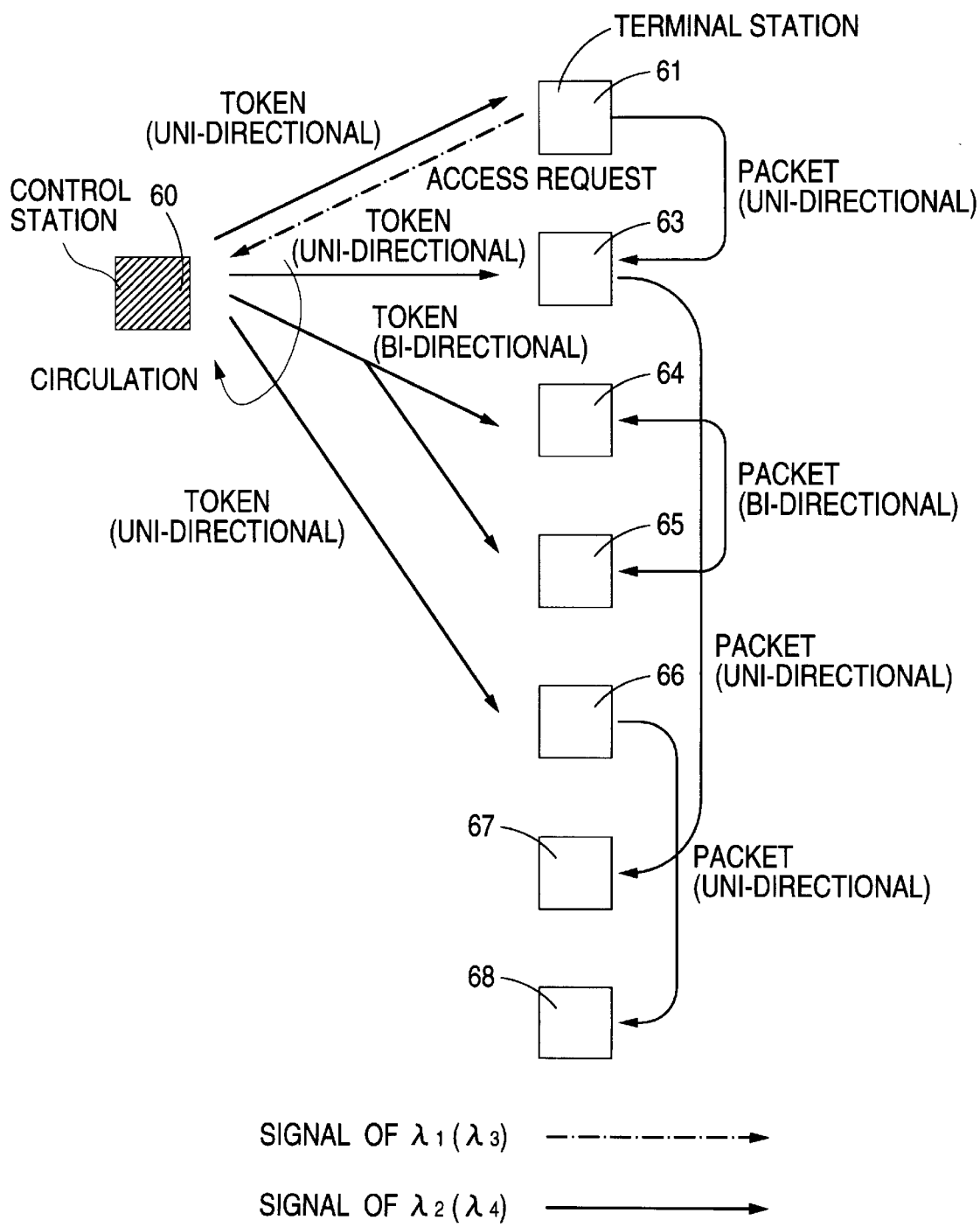
FIG. 18 schematically shows how the optical communications network of FIG. 16 behaves.

On the other hand, the TDMA protocol channel of wavelength $\lambda_2$ or $\lambda_4$ is controlled by a control station 60 (see FIG. 18). As shown in part (b) of FIG. 17, the control station 60 sends out tokens 71 at constant intervals. As shown in part (c) of FIG. 17, each token 71 consists of a header 72 indicating that the associated packet is a tokens the address of a first transmission-permitted station 73, and the address of a second transmission-permitted station 74. The address 74 may not be specified (null indication). A token in which both addresses 73 and 74 are specified is called a bi-directional token, and a token in which the address 74 is not specified is called a uni-directional token.

Following a token 71, a packet 75 is sent out from a transmission-permitted station to the TDMA protocol channel. The length of each packet 75 is so set as not to exceed the time slot (i.e., token interval).

As shown in part (d) of FIG. 17, each packet 75 consists of the address 76 of a station that has transmitted the packet concerned, the address 77 of a destination station, and a content 78 of information to be transmitted. Although the token 71 indicates the address of a transmission-permitted station, it does not specify where the transmission-permitted station sends a packet. The token 71 may indicate the address of a single station, or it may indicate the addresses of a plurality of stations according to a given rule.

FIG. 18 schematically shows how this network behaves. The control station 60 cyclically sends out tokens to the terminal stations 63–66. The control station 60 sends out, in the following order, a uni-directional token to the terminal station 63, bi-directional tokens to the terminal stations 64 and 65, and a uni-directional token to the terminal station 66. The terminal station 63 transmits a packet to a terminal station 67. The terminal stations 64 and 65 exchange a packet. The terminal station 66 transmits a packet to a terminal station 68. Since the optical communications network of this embodiment is bi-directional, the terminal station 64 can receive a packet sent out from the terminal station 65 and vice versa, the two packets having been sent out from those stations at the same time. The terminal stations 66–68 are not shown in FIG. 16.

When a new station attempts to join the above token circulation, it sends an access request to the control station 60 via the CSMA/CD protocol channel of wavelength $\lambda_1$ or $\lambda_3$. In FIG. 18, the terminal station 61 sends an access request via the channel of wavelength $\lambda_1$ or $\lambda_3$. Upon reception of the access request, the control terminal 60 allocates a token to the terminal station 61. Upon reception of the token, the terminal station 61 sends out a packet (uni-directional packet from the terminal station 61 to the terminal station 63) to the channel of wavelength $\lambda_2$ or $\lambda_4$. The CSMA/CD protocol channel of wavelength $\lambda_1$ or $\lambda_3$ is used not only for an access request to the control station 60 as described above but also for an ordinary packet exchange that does not require real-time processing.

Embodiment 11
Optical communications network

Figure 19:
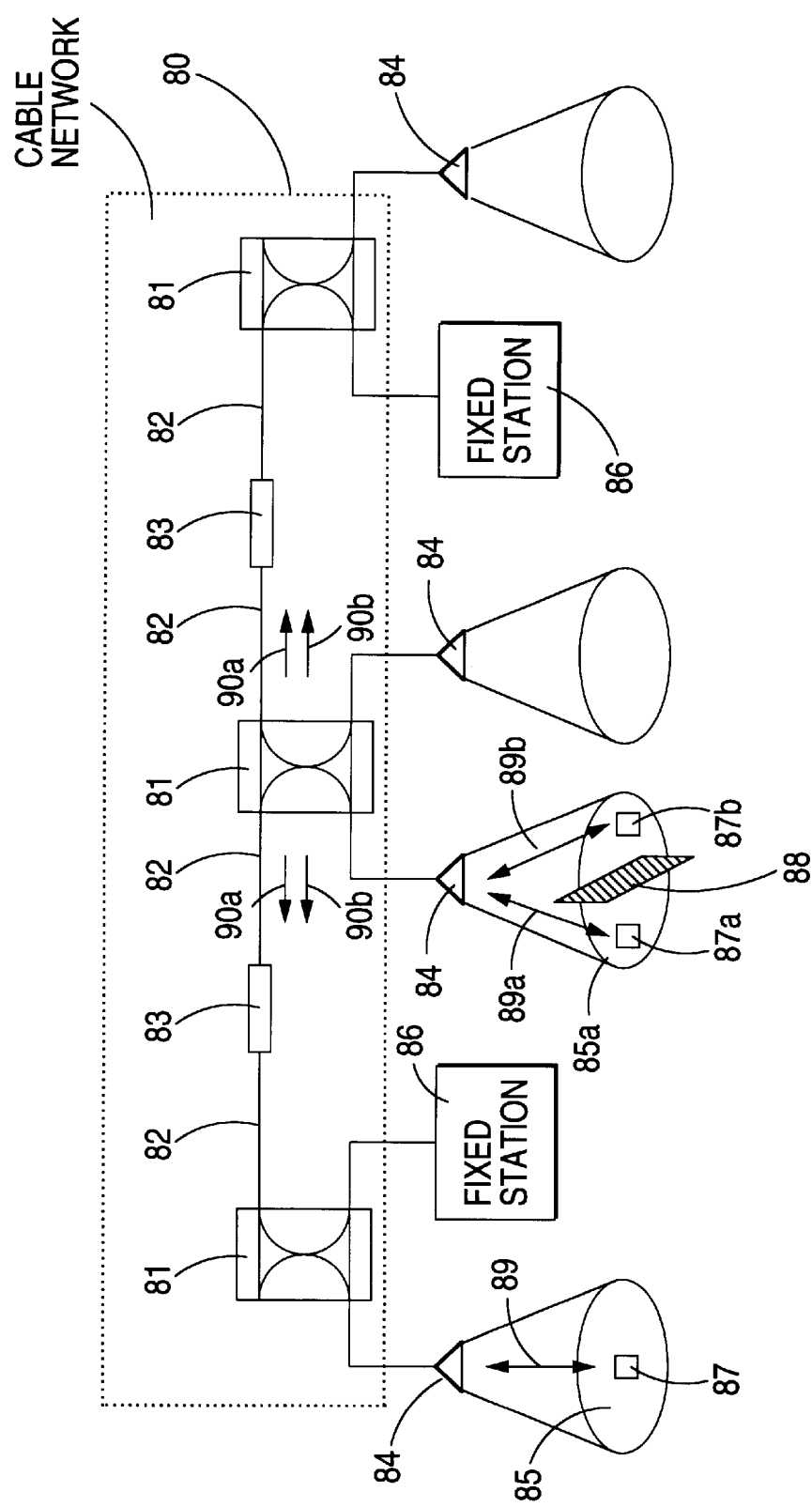
FIG. 19 schematically shows an optical communications network according to an eleventh embodiment of the invention.

FIG. 19 shows an optical communications network according to an eleventh embodiment of the invention. This is an example of a network in which cells 85 each constituted by using free space light are united by a cable network 80 in which interconnectable, passive 4-terminal star couplers 81 are connected to each other via an optical fiber cable 82 and a bi-directional optical relay amplifier 83. An optical signal 89 that is output from a mobile station 87 within a cell 85 or input to the mobile station 87 is linked to the cable network 80 via an optical relay amplifier 84 that effects a relay between free space transmission light and guided light. Reference numeral 86 denotes a fixed station.

The cells 85 are assigned a group of radio channels according to a given rule, and the cells 85 are so designed that electromagnetic interference between cells is within an allowable limit value. Mobile stations 87 in the same cell 85 directly communicate with each other by using the allocated radio channel. At least one optical relay amplifier 84 is provided for each cell 85, and communicates with the mobile stations 87 in the cell 85 by using the radio channel allocated to the cell 85. The optical relay amplifiers 84 are connected to each other via the star couplers 81 and the optical fiber cables 82. Mobile stations 87 belonging to different cells 85 communicate with each other such that communication between the mobile station 87 and the optical relay amplifier 84 is effected by using the radio channel allocated to the cell and communication between the optical relay amplifiers 84 is effected by optical fiber transmission. As described below, although the optical relay amplifier 84 converts free space transmission light to guided light and vice versa, it does not sends received free space transmission light back to the free space by using the same radio channel.

Figure 20:
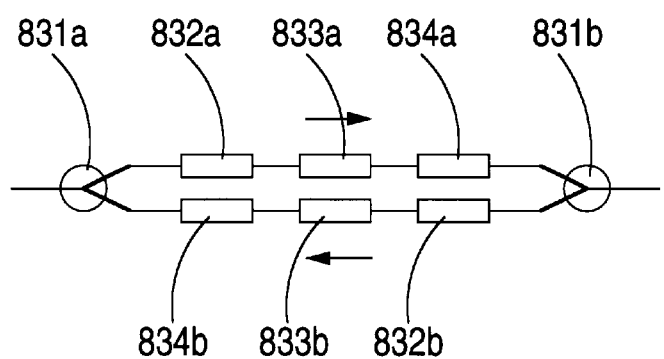
FIG. 20 schematically shows an internal configuration of a bi-directional optical relay amplifier used in the optical communications network of FIG. 19.

FIG. 20 shows an internal configuration of the bi-directional optical relay amplifier 83. Reproduction relay amplification of an optical signal propagating in the rightward direction in FIG. 20 is performed by an optical receiver 832a for converting a received optical signal into an electrical signal, an amplifier 833a for amplifying the electrical signal, and an optical transmitter 834a for converting the amplified electrical signal into an optical signal. Reproduction relay amplification of an optical signal propagating in the leftward direction in FIG. 20 is performed by an optical receiver 832b for converting a received optical signal into an electrical signal, an amplifier 833b for amplifying the electrical signal, and an optical transmitter 834b for converting the amplified electrical signal into an optical signal. The two reproduction relay amplification systems are coupled together by optical couplers 831a and 831b. Thus, optical signals traveling in both rightward and leftward directions in FIG. 20 can be amplified; that is, the function of a bi-directional optical relay amplifier is realized.

Figure 21:
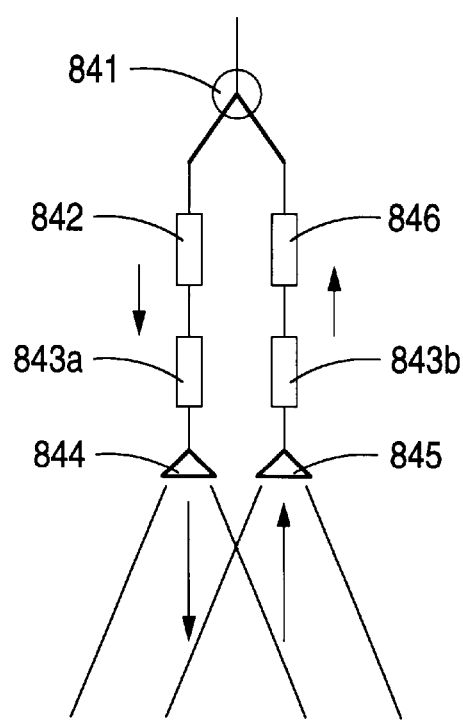
FIG. 21 schematically shows an internal configuration of an optical relay amplifier for a relay between free space transmission light and guided light used in the optical communications network of FIG. 19.

FIG. 21 shows an internal configuration of the optical relay amplifier 84 for a relay between free space transmission light and guided light. Reproduction relay amplification of an optical signal propagating in the downward direction in FIG. 21 is performed by an optical receiver 842 for converting an optical signal that is received from the cable network side into an electrical signal an amplifier 843a for amplifying the electrical signal, and an optical transmitter 844 for converting the amplified electrical signal into an optical signal and transmitting it to the free space. Reproduction relay amplification of an optical signal propagating in the upward direction in FIG. 21 is performed by an optical receiver 845 for converting an optical signal that is received from the free space into an electrical signal, an amplifier 843b for amplifying the electrical signal, and an optical transmitter 846 for converting the amplified electrical signal into an optical signal and transmitting it to the cable network side.

Figure 22A:
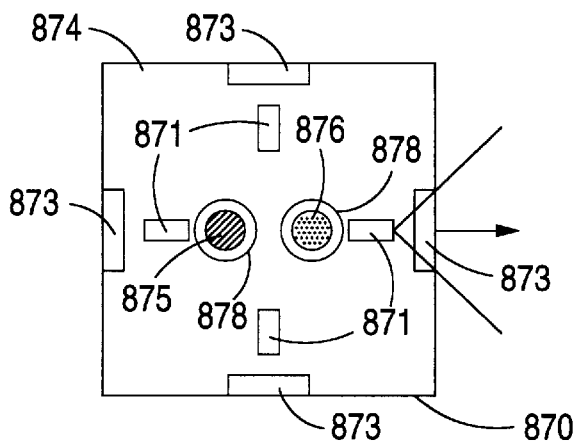
FIGS. 22A and 22B are a top view and a side view, respectively, showing an internal configuration of a wireless communication optical transceiver that is provided in a mobile station.
Figure 22B:
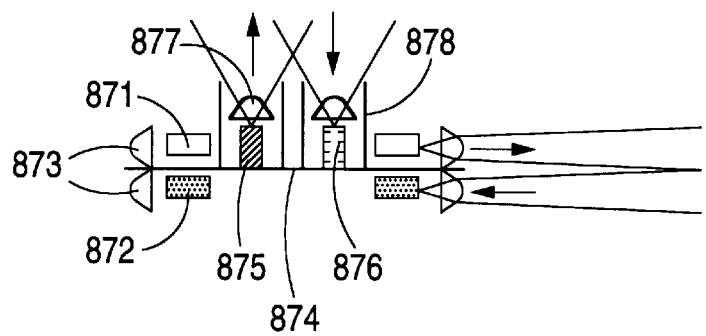

FIGS. 22A and 22B are a top view and a side view showing an internal configuration of an example of a wireless communication optical transceiver 870 provided in each mobile station 87 (see FIG. 19).

Light sources 871 for radiating free space light horizontally and photodetecting elements 872 for receiving free space light that comes horizontally are provided above and below a partition plate 874, respectively. Each of the light sources 871 and photodetecting elements 872 is provided with a cylindrical lens 873. There are provided four light sources 871 and four photodetecting elements 872 to cover the four horizontal directions. Therefore, there are eight cylindrical lenses 873 in total. In this specification, the optical system consisting of the light sources 871, the photodetecting elements 872, and the cylindrical lenses 873 is called "horizontal radiation system" Th horizontal radiation system is mainly used for communication between mobile terminals (mobile stations) and detection of a collision between mobile stations belonging to the same cell 85.

An optical system consisting of a light source 875, a photodetecting element 876, lenses 877, light shielding pipes 878 is provided above the partition plate 874. This optical system serves for transmission and reception of free space light in the vertical direction, and is called "vertical radiation system." The vertical radiation system is mainly used for a link between the mobile terminals 87 and the backbone network 80.

Each of the light sources 871 and 875 is an AlGaAs-type LED having an emission wavelength 850 nm, and each of the photodetecting elements 872 and 876 is a Si-pin photo-diode. The partition plate 874 and the light shielding pipes 878 are made of plastics and are painted black. They serve to prevent transmission light from going into the receiving side.

Figure 22C:
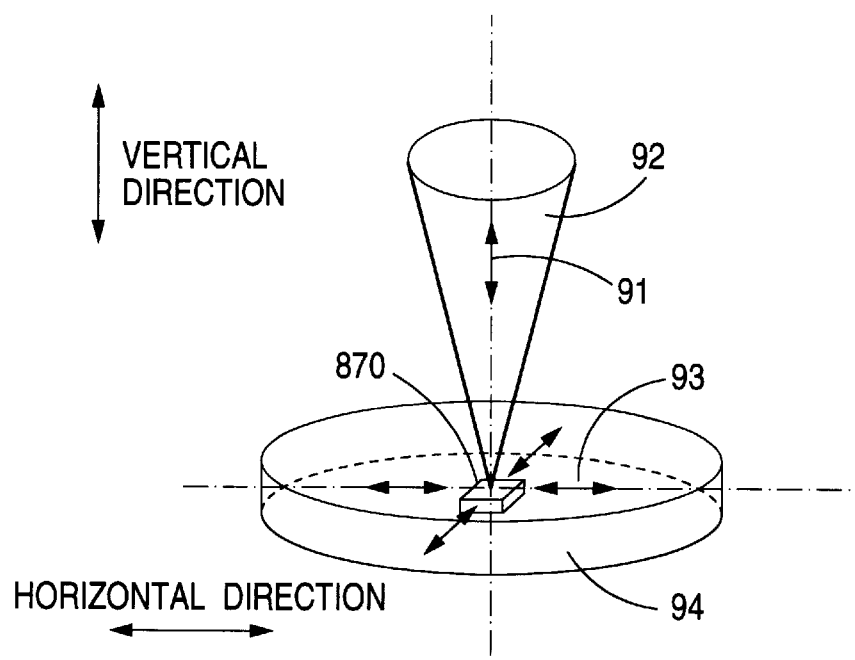
FIG. 22C illustrates directivity characteristics of signal light.

FIG. 22C schematically illustrates directivity characteristics of transmission and reception signal light beams of the wireless communication optical transceiver 870. An optical signal 91 of the vertical radiation system has a conical directivity characteristic 92. On the other hand, an optical signal 93 of the horizontal radiation system has a conical directivity characteristic 94. The optical signal 91 of the vertical radiation system is used for communication with the backbone network 80, and the optical signal 93 of the horizontal radiation system is used for communication between the mobile terminals (stations) 87 and detection of a collision between adjacent mobile terminals (stations) 87.

Each station (mobile station 87 or fixed station such as a server) in the network of FIG. 19 employs a known collision detection protocol in which the station judges that a collision has occurred when it receives a certain signal while it is transmitting a signal (see the paper by T. Tamura et al. mentioned above). This collision detection protocol can be applied only to a network having a feature that a signal transmitted from a certain station does not return to that station. An interconnectable star coupler and a free space can employ this collision detection protocol because they have the above feature, i.e., the feature that all the diagonal elements of a transfer matrix are zero.

Embodiment 12
Optical communications network

Figure 23:
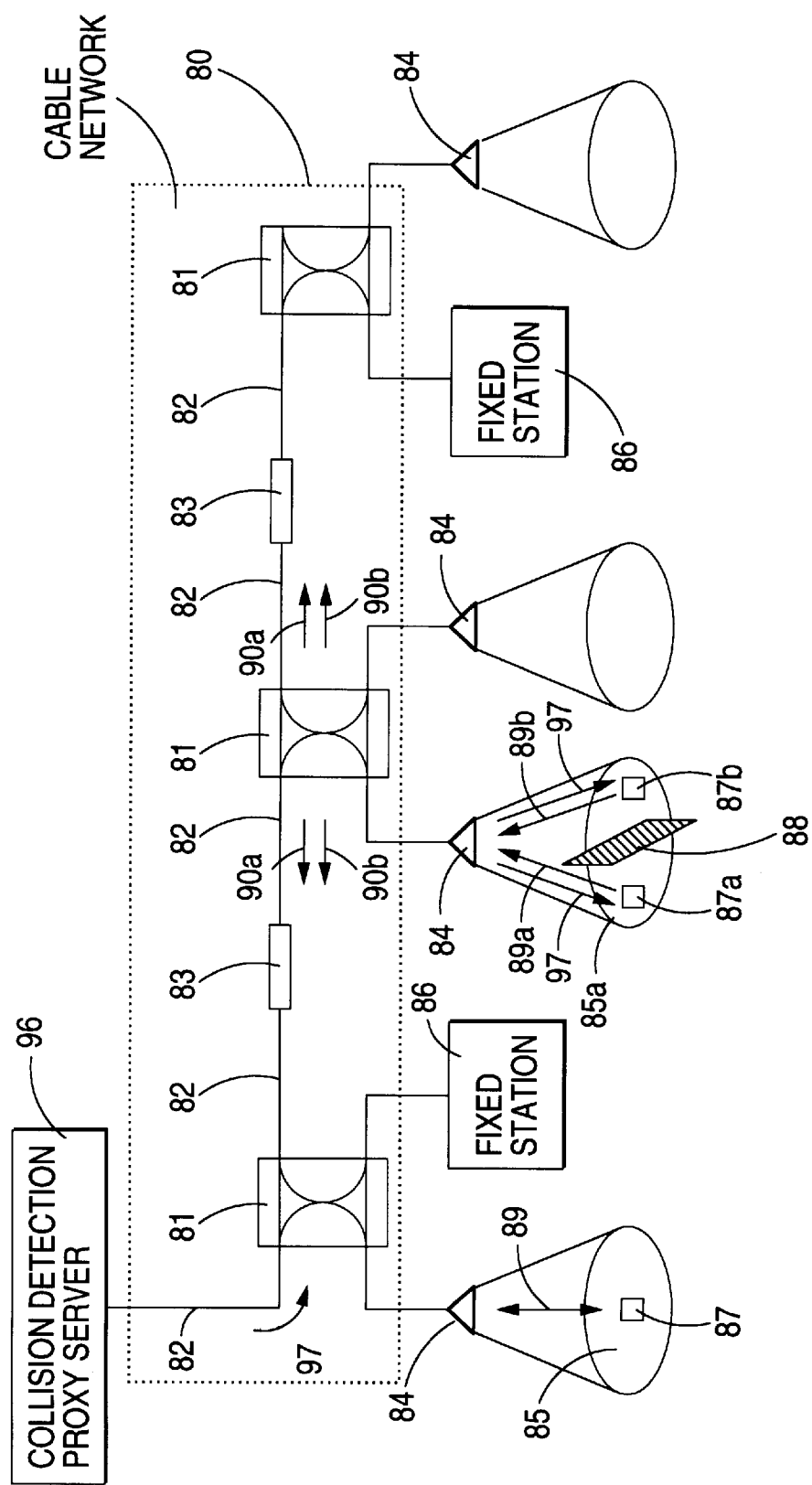
FIG. 23 schematically shows an optical communications network according to a twelfth embodiment of the invention.

FIG. 23 shows the configuration of an optical communications network according to a twelfth embodiment of the invention, which is different from the optical communications network of FIG. 19 in the addition of a collision detection proxy server 96. In FIG. 23, the components having the same functions as the corresponding components in FIG. 19 are given the same symbols and descriptions therefor are omitted.

Figure 24:
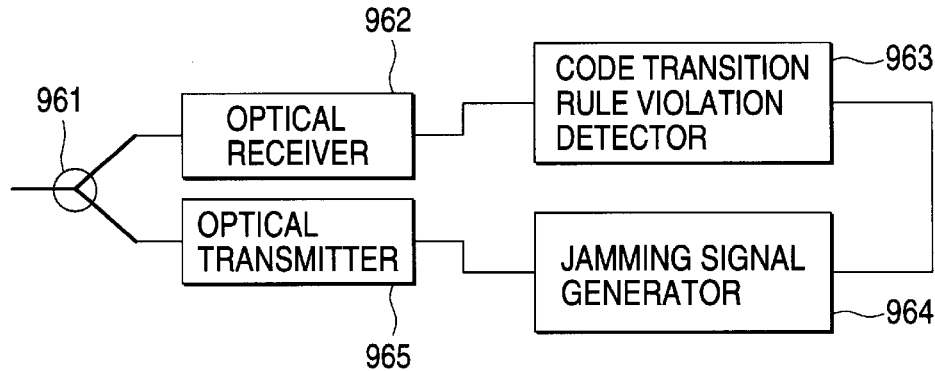
FIG. 24 schematically shows an internal configuration of a collision detection proxy server used in the optical communications network of FIG. 23.

FIG. 24 shows an internal configuration of the collision detection proxy server 96. An optical signal coming from the optical fiber cable 82 of the network of FIG. 23 is supplied via an optical coupler 961 to an optical receiver 962, where it is converted into an electrical signal. The resulting electrical signal is input to a code transition rule violation detector 963, which measures the frequency of occurrence of code transition rule violations (i.e., error rate) in the reception signal. The code transition rule violation detector 963 generates a trigger signal when the frequency of occurrence of code transition rule violations exceeds a given value (threshold). In response to the trigger signal, a jamming signal generator 964 generates a jamming signal 97. The generated jamming signal 97 is converted into an optical signal by an optical transmitter 965, and then sent out to the optical fiber cable 82 of the network of FIG. 23 via the optical coupler 961.

Figure 26:
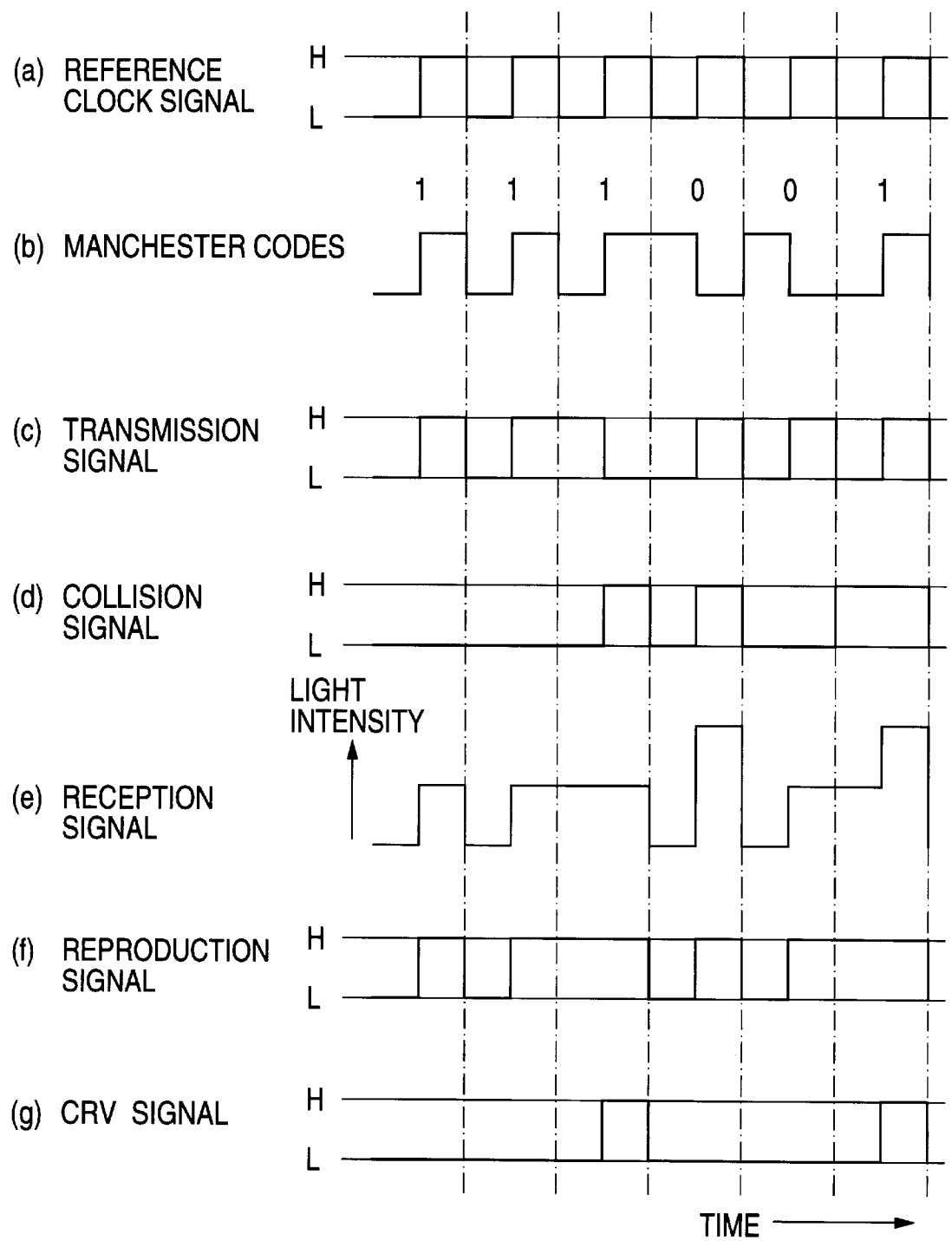
FIG. 26 is a timing chart showing the principle of a code rule violation method.

As described above, the collision detection method according to the principle of code transition rule violation (i.e., code rule violation method) used in this embodiment is, in itself, known. This method utilizes the fact that Manchester codes used in the Ethernet represent 1-bit information by 2 bits, that is, they have redundancy. FIG. 26 is a timing chart showing this principle. As shown in part (b) of FIG. 26, in Manchester codes, the H level or L level does not continue for more than one cycle of a reference clock signal shown in part (a). However, when a collision signal (part (d)) collides with a transmission signal (part (c)), a reception signal has a light intensity waveform shown in part (e), which is demodulated into a reproduction signal shown in part (f). That is, there may occur a case that the H level continues more than one cycle of the reference clock signal. In the code rule violation method, it is judged that a collision has occurred when a code that should not occur ordinarily (i.e., violation code) is detected. The code violation method can also be regarded as judging that a collision has occurred when the signal error rate being monitored exceeds a given threshold. As is understood from the above principle, this collision detection method is probabilistic. But this method can well be practiced by using proper hardware.

Next, the operation of this embodiment will be described. Referring to FIG. 23, assume that there are two mobile stations 87a and 87b in a cell 85a and a barrier 88 is interposed in between. When the two mobile stations 87a and 87b start transmitting signals approximately at the same time, they cannot recognize each other's start of the signal transmission because of the existence of the barrier 88. However, since the collision detection proxy server 96, which is directly connected to the cable network 80, receives optical signals 89a and 89b from the mobile stations 87a and 87b, it can detect a collision according to the above-mentioned code transition rule violation principle.

Figure 25:
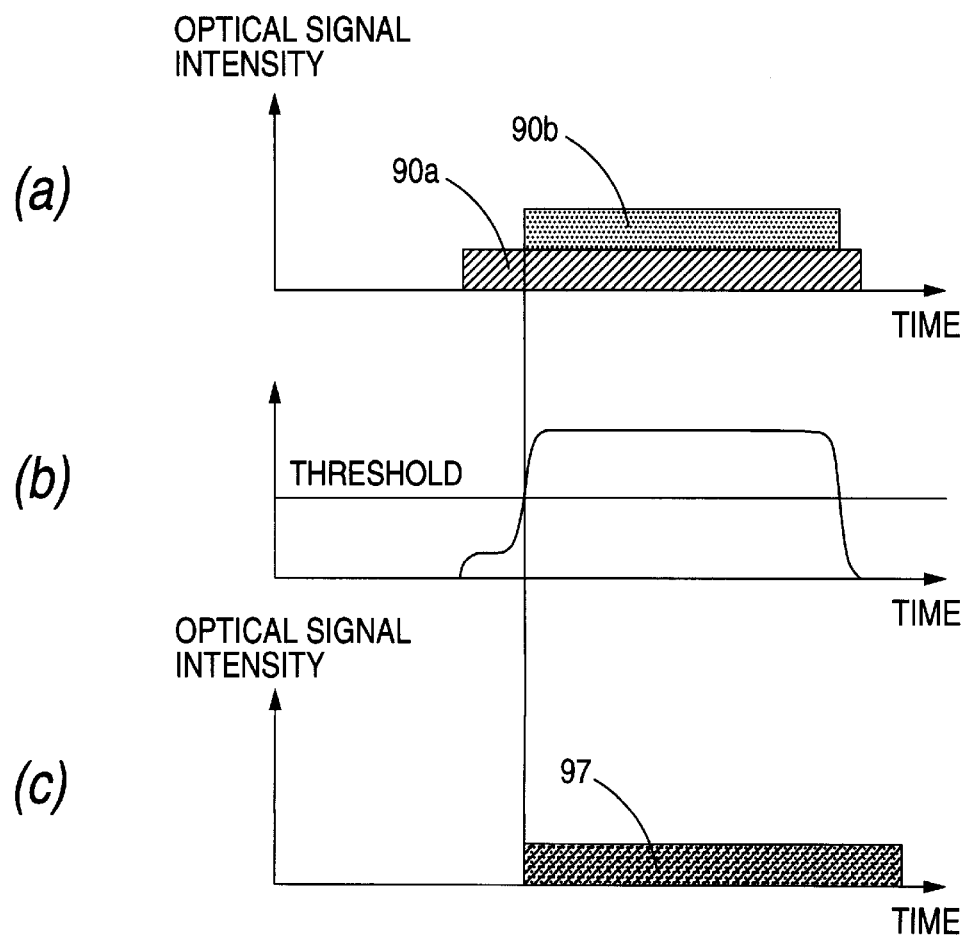
FIG. 25 is a timing chart showing the operation of a collision detection proxy server of FIG. 24.

Part (a) of FIG. 25 shows input signals to the collision detection proxy server 96, part (b) shows how the frequency of occurrence of code transition rule violations (error rate) varies over time in relation to the signals shown in part (a), and part (c) shows an optical signal that is transmitted from the collision detection proxy server 96.

The optical signals 89a and 89b transmitted from the mobile stations 87a and 87b are sent to the collision detection proxy server 96, where collision detection is performed according to the code transition rule violation principle. A detection result is broadcast to the entire network as a jamming signal 97. Since the mobile stations 87a and 87b receive the jamming signal 97, they can recognize the collision occurrence.

By virtue of the existence of the collision detection proxy server 96 that is connected to the cable network (backbone network) 80, the optical communications network according to the twelfth embodiment allows for reliable collision detection even in the case where a plurality of mobile stations within a cell cannot directly recognize each other's start of signal transmission due to barriers interposed therebetween (such stations are called "hidden terminals").

Embodiment 13
Optical communications network

Figure 27:
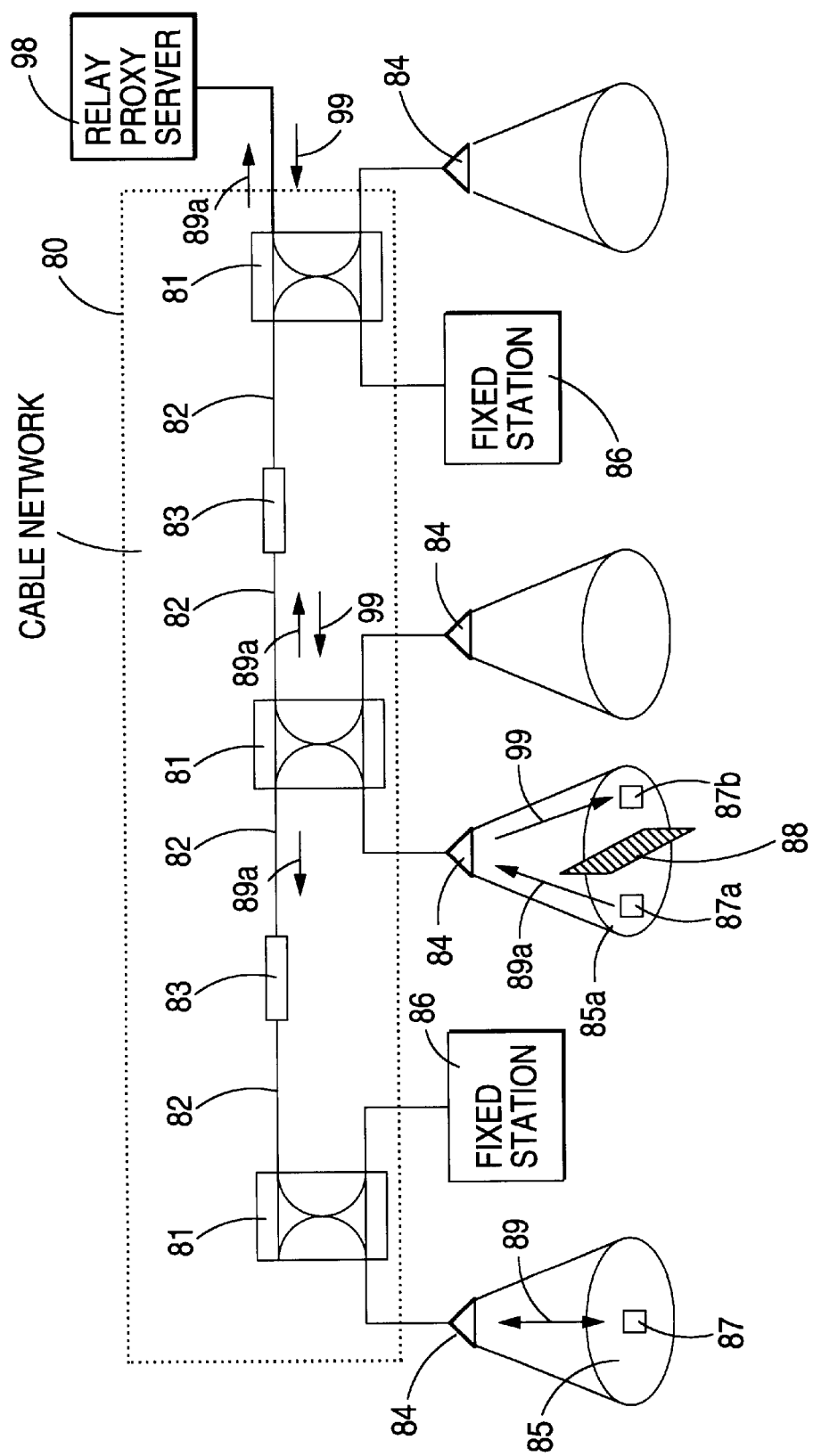
FIG. 27 schematically shows an optical communications network according to a thirteenth embodiment of the invention.

FIG. 27 shows the configuration of an optical communications network according to a thirteenth embodiment of the invention. This embodiment has a relay proxy server 98 in addition to the features of the FIG. 19 embodiment. In FIG. 27, the components having the same functions as the corresponding components in FIG. 19 are given the same symbols and descriptions therefor are omitted.

Figure 28:
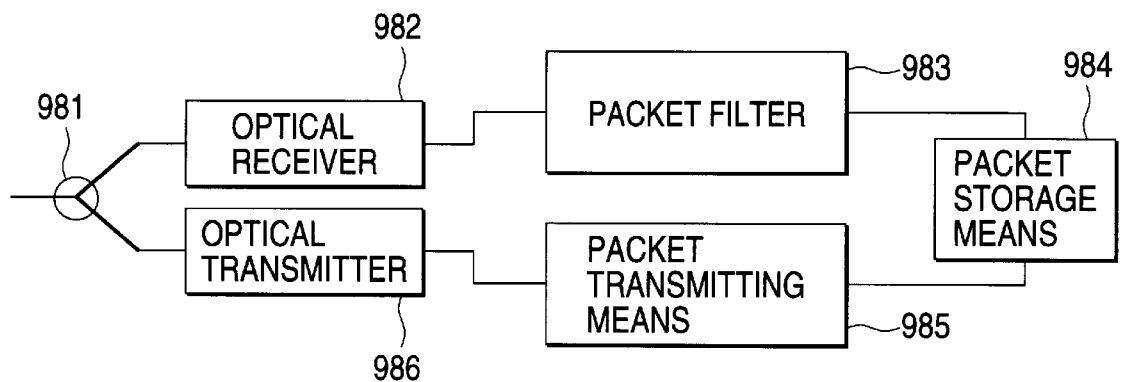
FIG. 28 schematically shows an internal configuration of a relay proxy server used in the optical communications network of FIG. 27.
Figure 29A:
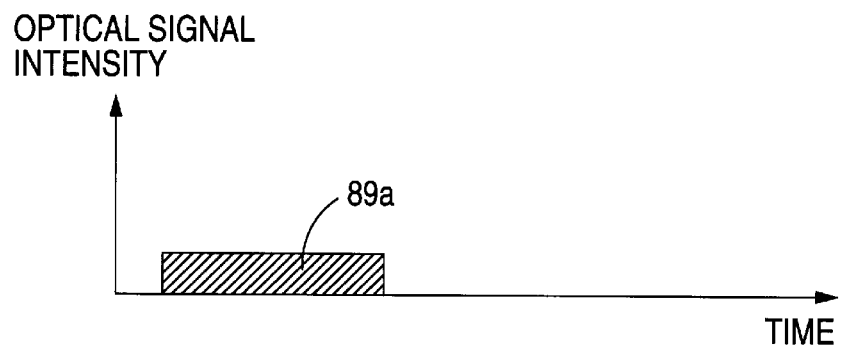
FIGS. 29A and 29B show a sequence of packet retransmission performed by the relay proxy server of FIG. 28.
Figure 29B:
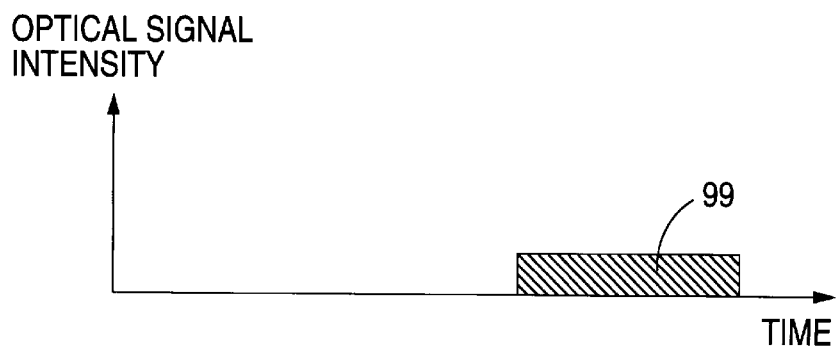

FIG. 28 shows an internal configuration of the relay proxy server 98. An optical signal coming from the optical fiber cable 82 of the work 80 is supplied, via an optical coupler 981, to an optical receiver 982, where it is converted into an electrical signal. The electrical signal is subjected to packet-by-packet sorting by a packet filter 983, and then stored into a packet storage means 984. Having an address table, the packet filter 983 sorts packets that are transmitted from mobile stations. Basically, the packet storage means 984 is a memory. Packets stored in the packet storage means 984 are retransmitted by a packet retransmitting means 985 to the optical fiber cable 82 of the network 80 via an optical transmitter 986 and an optical coupler 981 (see FIG. 27). FIG. 29 shows a sequence of the above packet retransmission. More specifically, part (a) of FIG. 29 shows an input signal to the relay proxy server 98, and part (b) shows an output signal therefrom.

As seen from FIGS. 27 and 29, an optical signal (packet) 89a originated from a mobile station 87a is retransmitted from the relay proxy server 98 with a certain delay. Since a retransmitted packet 99 is broadcast to the entire network shown in FIG. 27, a mobile station 87b can also receive it. That is, by virtue of the existence of the relay proxy server 98, the optical communications network according to this embodiment allows for a reliable communication even in the case where the mobile stations 87a and 87b are "hidden terminals" with respect to each other due to a barrier 88 interposed therebetween.

Embodiment 14
Optical communications network

Figure 30:
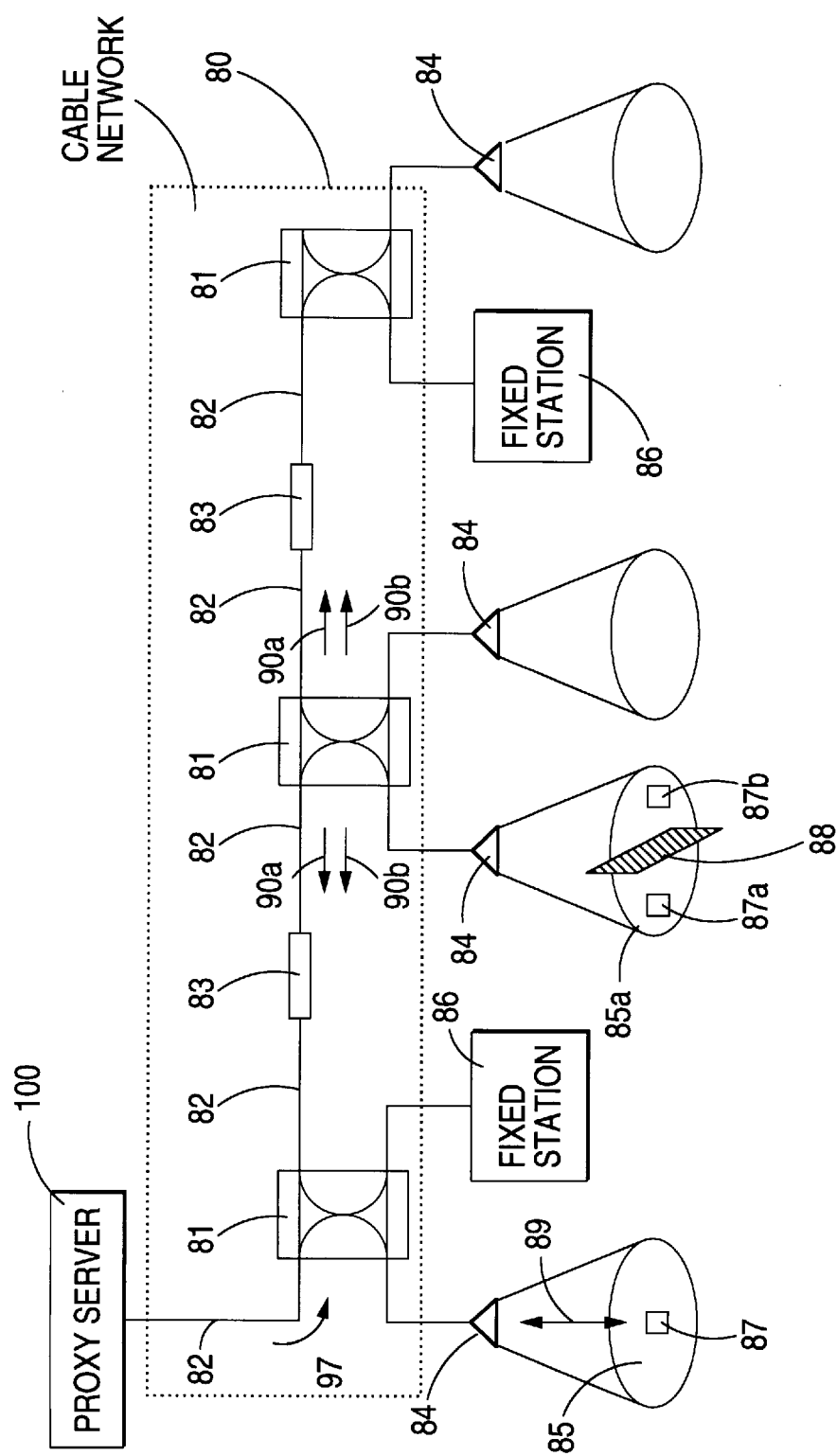
FIG. 30 schematically shows an optical communications network according to a fourteenth embodiment of the invention.
Figure 31:
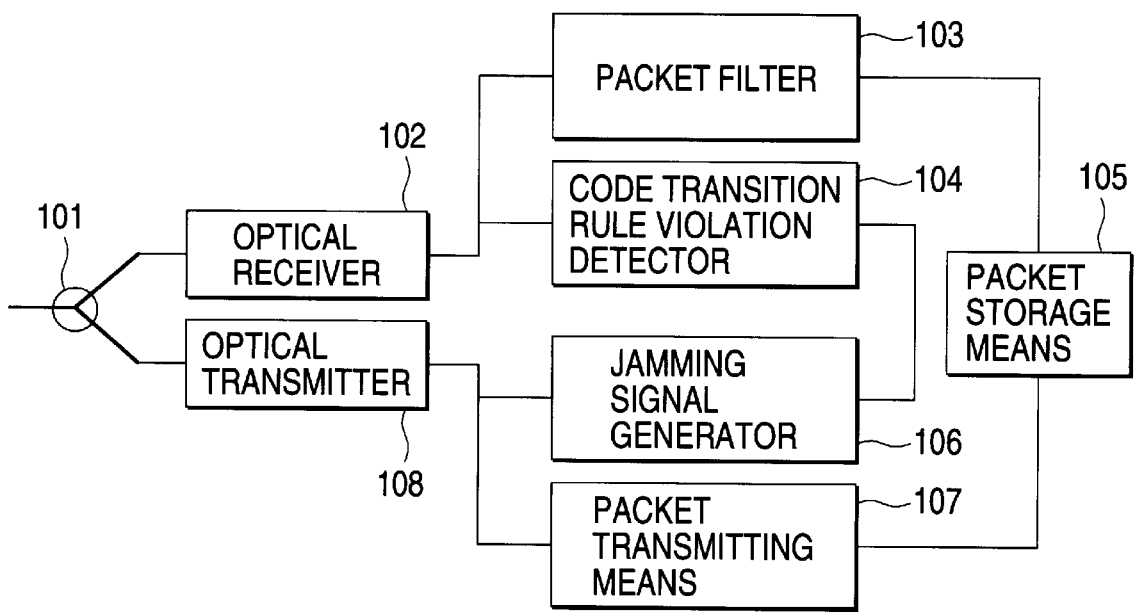
FIG. 31 schematically shows an internal configuration of a proxy server having both functions of collision detection proxy and relay proxy.

FIG. 30 shows an optical communications network according to a fourteenth embodiment of the invention. This embodiment has, in addition to the features of the FIG. 19 embodiment, a proxy server 100 having both functions of collision detection proxy and relay proxy. FIG. 31 shows an internal configuration of the proxy server 100. Reference numeral 101 denotes an optical coupler; 102, an optical receiver; 103, a packet filter; 104, a code transition rule violation detector; 105 a packet storage means; 106, a jamming signal generator; 107, a packet retransmitting means; and 108, an optical transmitter.

The configuration of FIG. 31 allows the single proxy server 100 to have both functions of collision detection proxy and relay proxy. Thus, even in the case where hidden terminals exist, the optical communications network of this embodiment allows for reliable collision detection by the collision detection proxy function of the proxy server 100 as well as a reliable communication between mobile stations by its relay proxy function.

Since each of the optical coupler 101, the optical receiver 102, and the optical transmitter 108 is shared by both functions, the proxy server 100 can be simplified compared to the case of separately providing a collision detection proxy server and a relay proxy server.

Examples of various items of physical layer of each embodiment of optical communications network (Basic data)

Figure 32:
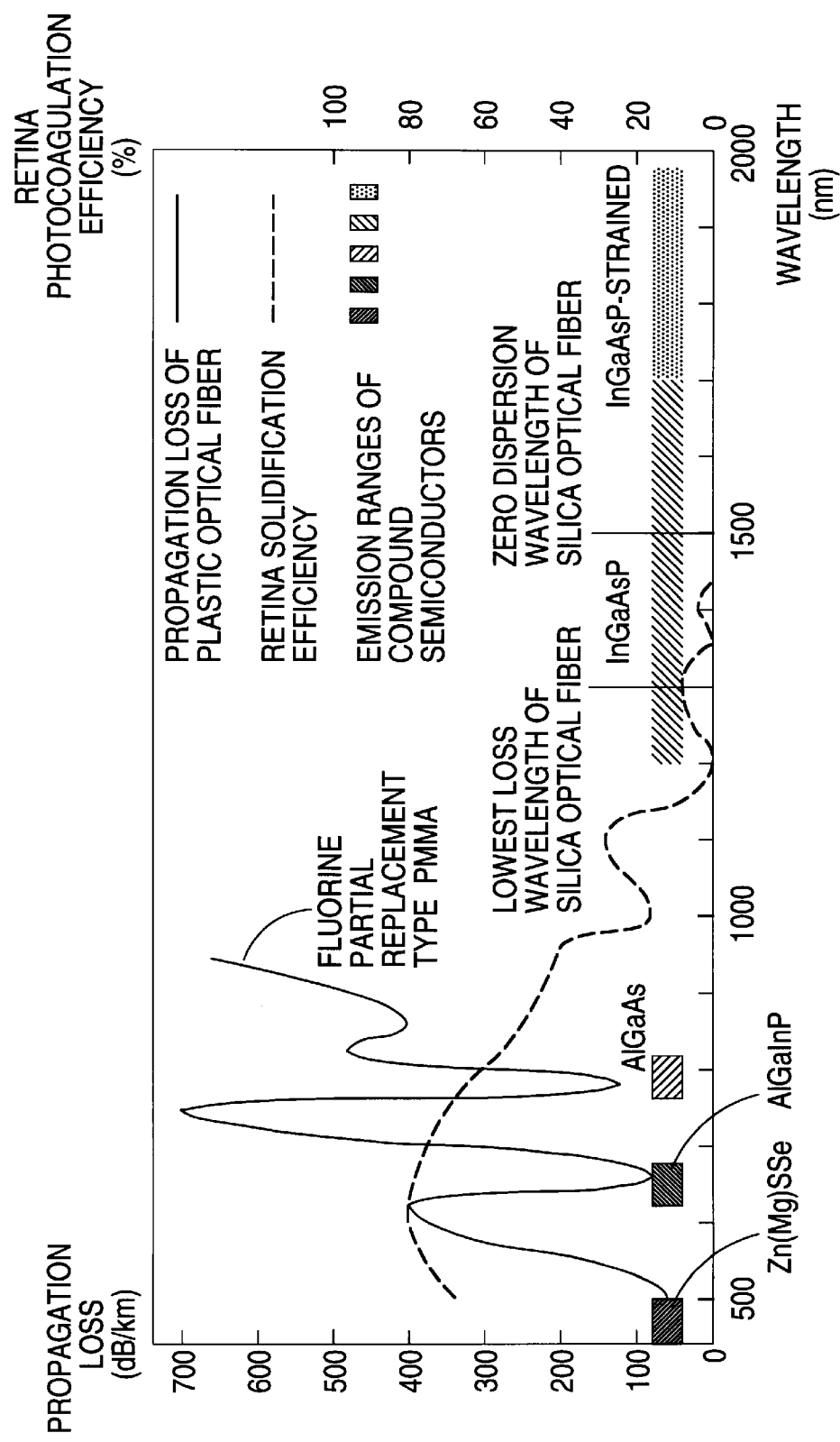
FIG. 32 is a graph showing a wavelength dependence of the transmission loss of an optical fiber, a wavelength dependence of the retina photocoagulation efficiency, and emission wavelength ranges of various compound semiconductors.

FIG. 32 is a graph containing basic data to be used in determining the wavelength of light to propagate through a free space or an optical fiber. More specifically, FIG. 32 shows a wavelength dependence of the transmission loss of an optical fiber, a wavelength dependence of the retina photocoagulation efficiency, and emission wavelength ranges of various compound semiconductors. The data of the retina photocoagulation efficiency is cited from page 758 of "Laser Handbook" edited by the Laser Society of Japan (published by Ohmsha, Ltd.).

It is seen from FIG. 32 that the transmission of a fluorine partial replacement type PMMA optical fiber have minimum values around 500 nm, 650 nm, and 780 nm. FIG. 32 also shows a lowest loss wavelength (1,300 nm) and a zero-dispersion wavelength (1,500 nm) of a silica optical fiber. Although the loss of a silica optical fiber is negligible for a transmission distance of about several hundred meters, light-emitting elements are developed so as to be suited to its lowest loss wavelength (1,300 nm) and zero-dispersion wavelength (1,500 nm). This wavelength range is therefore important in designing.

The retina photocoagulation efficiency is the product of the light transmittance of an eyeball and the light absorbance of a retina. A larger retina photocoagulation efficiency means that an eye is allowed to be exposed to a smaller amount of light, that is, light is more dangerous to an eye. As is apparent from FIG. 32, the retina photocoagulation efficiency is small in a frequency range longer than 1,200 nm and is almost zero in a frequency range over 1,500 nm.

As for the emission wavelength ranges of compound semiconductors, Zn(Mg)SSe (lattice-matched with a GaAs substrate) has an emission wavelength range of 450–500 nm; AlGaInP (lattice-matched with a GaAs substrate), 630–680 nm; AlGaAs (lattice-matched with a GaAs substrate), 750–830 nm; InGaAsP (lattice-matched with an InP substrate), 1,200–1,700 nm; and InGaAsP-strained (lattice-unmatched with an InP substrate), 1,500–2,000 nm.

Figure 33:
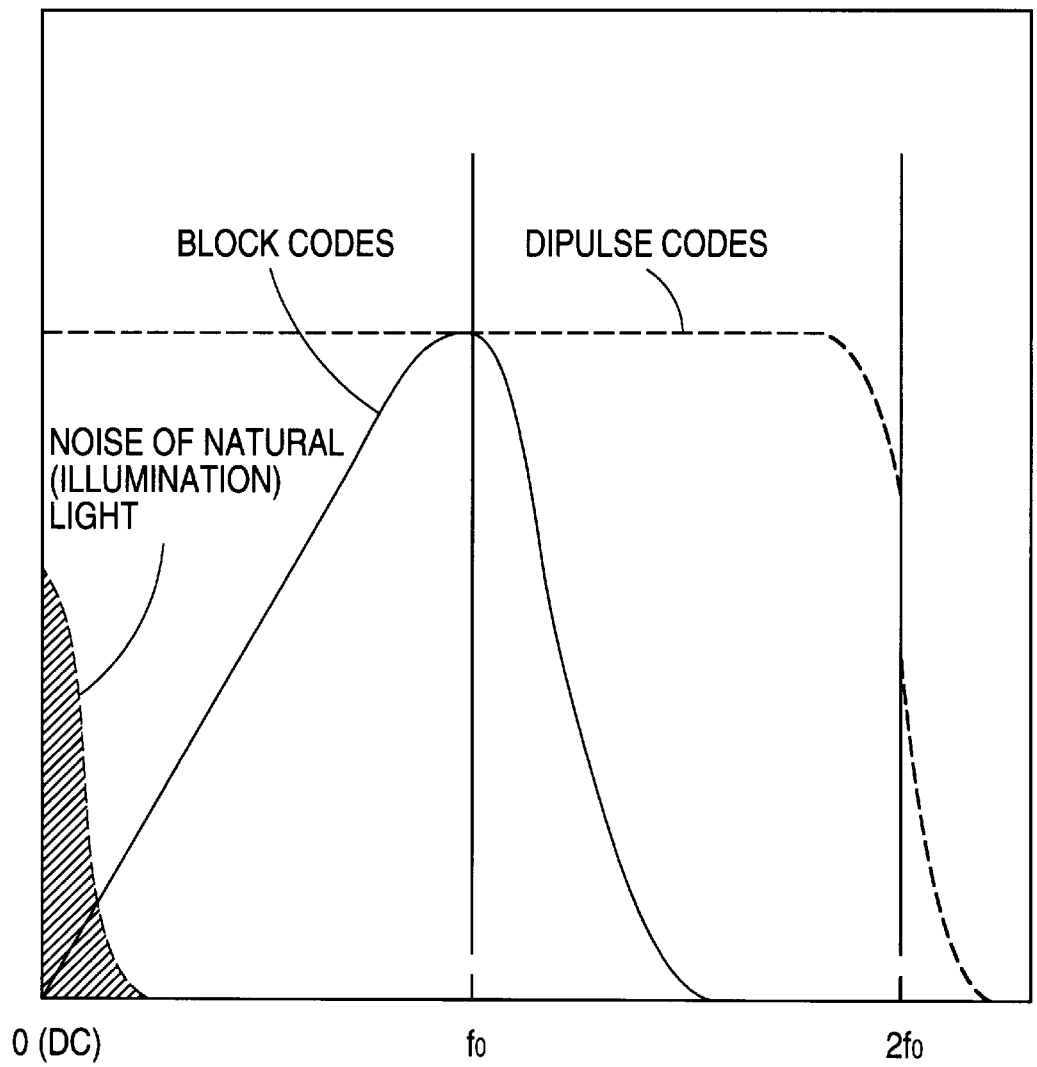
FIG. 33 is a graph showing power spectra of dipulse codes and block codes.
Figure 38A:
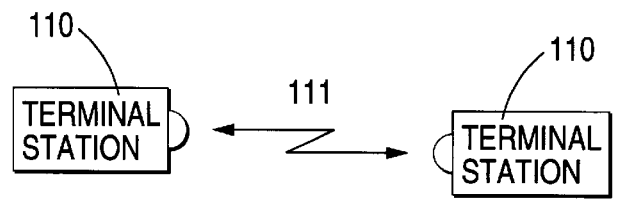
FIGS. 38A–38D show general configurations of conventional optical communications systems and networks.
Figure 38B:
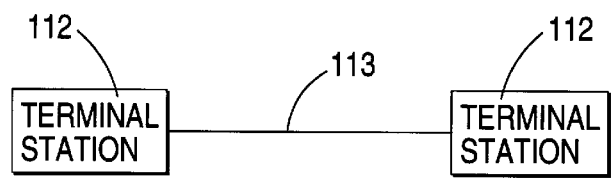
Figure 38C:
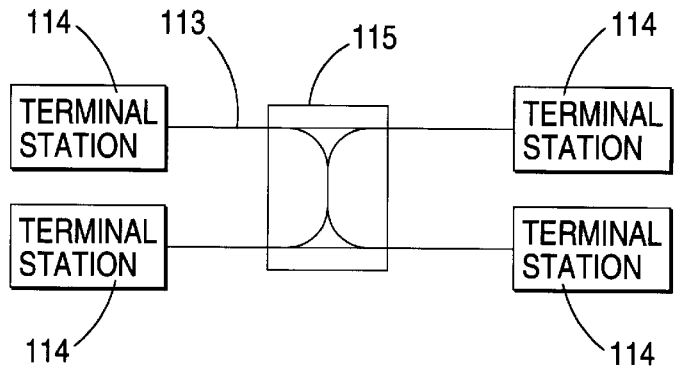
Figure 38D:
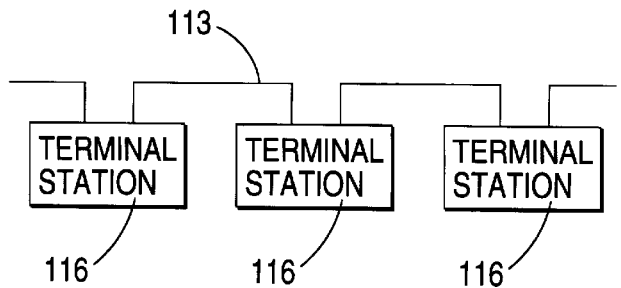
Figure 39:
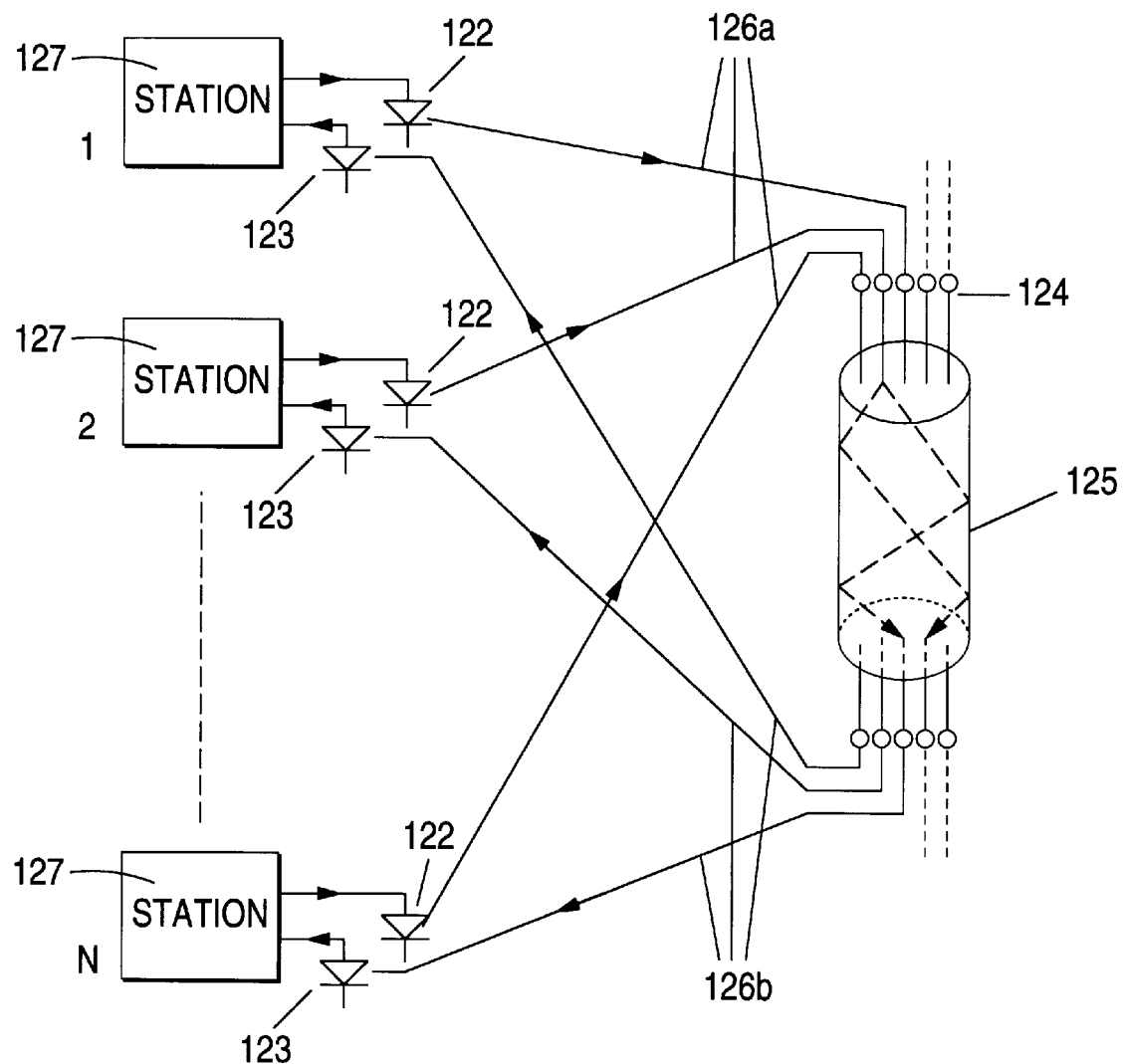
FIG. 39 shows a general configuration of a conventional optical communications network using an ordinary star coupler.

FIG. 33 is a graph showing a relationship among power spectra of dipulse codes, block codes, and natural or illumination light. It is seen that block codes are more suitable than dipulse codes for the purpose of reducing the influences of natural or illumination light. The graph of FIG. 33 is also basic data necessary in constructing an optical transmitter and an optical communications network.

It is known in the optical communications technology that there are two kinds of signal modulation schemes: RZ (return to zero) and NRZ (non-return to zero). Light is not transmitted in the RZ scheme when there is no signal transmission request, whereas light is transmitted in the NRZ scheme even when there is no signal transmission request. Usually the RZ scheme is employed for free space optical transmission and the NRZ scheme is used for point-to-point optical fiber transmission.

(Example 1 of combinations of transmission mediums wavelength range, and light source)

FIG. 34 shows specific examples of various items of the network physical layer of the invention. FIG. 34 also includes corresponding items of the IrDA (infrared data association) which is a standard for free space optical communication and the fiber channel which is a standard for short-distance optical communication using an optical fiber.

The IrDA and the fiber channel are not compatible in the physical layer because they employ modulation schemes of RZ and NRZ, respectively. That is, although both of the IrDA and the fiber channel perform communication by using light, mutual communication cannot be attained merely by providing an interface means between free space light and light propagating through an optical fiber.

Both of the IrDA and the fiber channel employ point-to-point protocols. In these standards, no consideration is made of formation of a network of three or more stations on a free space or an optical fiber network using a star coupler. That is, they do not support communication among a plurality of stations in lower-level communication layers of the physical layer and the data link layer.

In contrast, the specific example of the network physical layer of the invention shown in FIG. 34 employs RZ modulation and a data link protocol of CSMA/CD which uses a carrier detection type collision detection method. This allows employment, as a transmission medium, of both of a free space and an optical fiber network using a star coupler.

Further, by virtue of additional employment of wavelength multiplexing, it is possible to perform an ordinary data communication according to CSMA/CD by using a fundamental, first wavelength, and to transmit an audio or video signal that requires real-time transmission by TDMA by using an additionally provided second wavelength. The term "additional" as used above means that an ordinary data communication can be performed only by using the fundamental, first wavelength. A station which need not deal with an audio or video signal that requires real-time transmission need not have a transmission system of the second wavelength.

The specific example of the network physical layer of FIG. 34 employs block coding to reduce the influences of noise due to natural or illumination light.

FIGS. 35A–35B, 36A–36B, and 37A–37B show several examples of combinations of a transmission medium a wavelength range, and a light source. In those drawings, abbreviations SLD, LED, and LD means a superluminescent light-emitting diode, a light-emitting diode, and a semiconductor laser (i.e., laser diode), respectively. While the superluminescent light-emitting diode can provide a high modulation rate of several gigabits/s, which is equivalent to the modulation rate of the semiconductor laser, it emits light that is low in coherence, i.e., safer to human eyes. Although the modulation rate of the light-emitting diode is as low as about 100 megabits/s, it is inexpensive and emits low-coherence light. Although the semiconductor laser can provide a high modulation rate of several gigabits/s and a large optical output power, it emits light that is high in coherence, i.e., less safe to human eyes. A combination shown in FIG. 35A has been determined based on the optical fiber characteristics and the retina photocoagulation efficiency of FIG. 32.

The relationship between the coherence of emitted light and the degree of its safety to human eyes is as follows. It is known that highly coherent lights for instance, laser light, can be converged to a size that is equivalent to the diffraction limit size. Since an eyeball has lens action, it may occur a case that under certain conditions, light coming from a free space is converged by an eyeball to form, on the retina, a light spot whose diameter is approximately equal to the wavelength of the light. In such a case, the retina is likely damaged because of energy concentration in a small area. In contrast, low-coherence light coming from a free space is hardly converged into a small spot, and is therefore safer than the same quantity of light that is highly coherent.

(Example 2 of combinations of transmission medium, wavelength ranges and light source)

FIG. 35B shows a second example of combinations of a transmission medium, a wavelength range, and a light source which can be applied to the optical communications network of the invention. In this example, a silica optical fiber is used and corresponding wavelength ranges for a free space and an optical fiber are set identical: $\lambda_1=\lambda_3=1,250-1,350$ nm, and $\lambda_2=\lambda_4=1,450-1,550$ nm. The wavelength ranges of $\lambda_1=\lambda_3$ and $\lambda_2=\lambda_4$ may be interchanged. These wavelength ranges are so set as to allow easy obtainment of a light-emitting device. As for the light-emitting devices the SLD, LD, and LED are desirable in this descending order.

(Example 3 of combinations of transmission medium, wavelength ranges and light source)

FIG. 36A shows a third example of combinations of a transmission medium, a wavelength range, and a light source which can be applied to the optical communications network of the invention. This example uses a plastic optical fiber. Wavelength ranges safer to human eyes are selected for free space transmission, and wavelength ranges providing lower loss in a plastic optical fiber are selected for optical fiber transmission: $\lambda_1=630-680$ nm, $\lambda_2=750-830$ nm, $\lambda_3=1,250-1,350$ nm, and $\lambda_4=1,450-1,550$ nm. Light-emitting devices are ones that are also used widely for other purposes and are therefore inexpensive. The wavelength ranges of $\lambda_3$ and $\lambda_4$ may be interchanged. Similarly, $\lambda_1$ and $\lambda_2$ may be interchanged. As for the light-emitting devices the SLD, LD, and LED are desirable in this descending order.

(Example 4 of combinations of transmission medium, wavelength range, and light source)

FIG. 36B shows a fourth example of combinations of a transmission medium, a wavelength range, and a light source which can be applied to the optical communications network of the invention. This example uses a plastic optical fiber. Wavelength ranges safer to human eyes are selected for free space transmission, and wavelength ranges providing lower loss in a plastic optical fiber are selected for optical fiber transmission: $\lambda_1=450-500$ nm, $\lambda_2=630-680$ nm, $\lambda_3=1,700-1,850$ nm, and $\lambda_4=1,850-2,000$ nm. Light-emitting devices are ones that are also used widely for other purposes and are therefore inexpensive. The wavelength ranges of $\lambda_3$ and $\lambda_4$ may be interchanged. Similarly, $\lambda_1$ and $\lambda_2$ may be interchanged. As for the light-emitting device, the SLD, LD, and LED are desirable in this descending order.

(Example 5 of combinations of transmission medium, wavelength range, and light source)

FIG. 37A shows a fifth example of combinations of a transmission medium, a wavelength range, and a light source which can be applied to the optical communications network of the invention. The optical communications network of the tenth embodiment (see FIG. 16) is a modified version of the optical communications network of the ninth embodiment (see FIG. 14A) in which the wavelength multiplexing is employed additionally. The optical communications network of the tenth embodiment can perform data communication even without a TDMA protocol channel. This fifth example of combinations is directed to the above case of not performing wavelength multiplexing. This example corresponds to part of the second example shown in FIG. 35B. This example employs a silica optical fiber. As for the light-emitting device, the SLD and the LED are desirable in this descending order. The optical transceiver 1 of the first embodiment (see FIGS. 1A–1C and 2A–2B) can be used in this example.

(Example 6 of combinations of transmission medium, wavelength ranges and light source)

FIG. 37B shows a sixth example of combinations of a transmission medium, a wavelength range, and a light source which can be applied to the optical communications network of the invention. As in the case of the fifth example, this example of combinations is directed to a design which does not include wavelength multiplexing. This example corresponds to part of the third example shown in FIG. 36A. This example employs a plastic optical fiber. As for the light-emitting device, the SLD and the LED are desirable in this descending order.

What is claimed is:

1. An optical transceiver comprising:

a light-emitting element that emits an optical signal;

a photodetecting element that converts an optical signal into an electrical signal;

first coupling means for optically coupling the light-emitting element and the photodetecting element to an optical fiber transmission path;

second coupling means for optically coupling the light-emitting element and the photodetecting element to a free space when the light-emitting element and the photodetecting element are not coupled to the optical fiber transmission path by the first coupling means;

driving means for driving the light-emitting element in accordance with an electrical signal that is supplied from an external system; and output means for outputting, to the external system, the electrical signal produced by the photodetecting element.

2. The optical transceiver according to claim 1, wherein the first coupling means includes an optical jack that holds the light-emitting element and the photodetecting element so that they are coupled to the optical fiber transmission path when the optical jack is connected to an optical plug that is attached to an end portion of the optical fiber transmission path, and wherein the second coupling means includes at least one lens which is located on an optical path from the light-emitting element to the free space and an optical path from the free space to the photodetecting element when the optical plug is removed from the optical jack.

3. The optical transceiver according to claim 2, further comprising bias means for biasing the at least one lens so that the at least one lens is located on the optical path from the light-emitting element to the free space and the optical path from the free space to the photodetecting element when the optical plug is removed from the optical jack.

4. The optical transceiver according to claim 2, further comprising bias means for biasing the at least one lens, wherein the at least one lens is moved against a bias force of the bias means when the optical plug is connected to the optical jack.

5. The optical transceiver according to claim 1, wherein the light-emitting element emits an optical signal having a wavelength of 1,200 to 2,000 nm to the free space.

6. An optical transceiver comprising:
a plurality of light-emitting elements that emit optical signals of different wavelengths;
a plurality of photodetecting elements that convert optical signals of different wavelengths into electrical signals;
first coupling means for optically coupling the light-emitting elements and the photodetecting elements to an optical fiber transmission path;
second coupling means for optically coupling the light-emitting elements and the photodetecting elements to a free space when the light-emitting elements and the photodetecting elements are not coupled to the optical fiber transmission path by the first coupling means;
driving means for driving the respective light-emitting elements in accordance with electrical signals that are supplied from an external system; and
output means for outputting, to the external system, the electrical signals produced by the respective photodetecting elements.

7. The optical transceiver according to claim 6, wherein the first coupling means includes an optical jack that holds the light-emitting elements and the photodetecting elements so that they are coupled to the optical fiber transmission path when the optical jack is connected to an optical plug that is attached to an end portion of the optical fiber transmission path, and wherein the second coupling means includes a lens which is located on an optical path from the light-emitting elements to the free space and an optical path from the free space to the photodetecting elements when the optical plug is removed from the optical jack.

8. The optical transceiver according to claim 7, further comprising bias means for biasing the lens so that the lens is located on the optical path from the light-emitting elements to the free space and the optical path from the free space to the photodetecting elements when the optical plug is removed from the optical jack.

9. The optical transceiver according to claim 7, further comprising bias means for biasing the lens, wherein the lens is moved against a bias force of the bias means when the optical plug is connected to the optical jack.

10. An optical transceiver comprising:
a first light-emitting element that emits an optical signal to an optical fiber transmission path;
a first photodetecting element that converts an optical signal coming from the optical fiber transmission path into an electrical signal;
a second light-emitting element that emits an optical signal to a free space;
a second photodetecting element that converts an optical signal coming from the free space into an electrical signal;
first coupling means for optically coupling the first light-emitting element and the first photodetecting element to the optical fiber transmission path;
second coupling means for optically coupling the second light-emitting element and the second photodetecting element to the free space;
a matrix circuit, having a transfer characteristic in which all of diagonal elements are zero, that supplies the electrical signal produced by the first photodetecting element to the second light-emitting element or an external system, supplies the electrical signal produced by the second photodetecting element to the first light-emitting element or the external system, and supplies an electrical signal that is supplied from the external system to the first or second photodetecting element;
first driving means for driving the first light-emitting element in accordance with the electrical signal that is supplied from the matrix circuit to the first light-emitting element; and
second driving means for driving the second light-emitting element in accordance with the electrical signal that is supplied from the matrix circuit to the second light-emitting elements.

11. An optical transceiver comprising:
a plurality of first light-emitting elements that emit optical signals of different wavelengths to an optical fiber transmission path;
a plurality of first photodetecting elements that convert optical signals of different wavelengths coming from the optical fiber transmission path into electrical signals;
a plurality of second light-emitting elements that emit optical signals of different wavelengths to a free space;
a plurality of second photodetecting elements that convert optical signals of different wavelengths coming from the free space into electrical signals;
first coupling means for optically coupling the first light-emitting elements and the first photodetecting elements to the optical fiber transmission path;
second coupling means for optically coupling the second light-emitting elements and the second photodetecting elements to the free space;
a matrix circuit, having a transfer characteristic in which all of diagonal elements are zero, that supplies an electrical signal produced by one of the first photodetecting elements to one of the second light-emitting elements or an external system, supplies an electrical signal produced by one of the second photodetecting elements to one of the first light-emitting elements or the external system, and supplies an electrical signal that is supplied from the external system to one of the first photodetecting elements or one of the second photodetecting elements;
first driving means for driving the one of the first light-emitting elements in accordance with the electrical signal that is supplied from the matrix circuit to the one of the first light-emitting elements; and
second driving means for driving the one of the second light-emitting elements in accordance with the electrical signal that is supplied from the matrix circuit to the one of the second light-emitting elements.

12. An optical communications network comprising:
a transmitter that transmits a guided light wave signal that is modulated according to a RZ scheme to an optical fiber transmission path;
a star coupler having a transfer matrix in which all of diagonal elements are zero, and having at least first and second terminals;
conversion means for receiving the guided light wave signal from the optical fiber transmission path, for converting the received guided light wave signal into a free space transmission optical signal that is modulated according to the RZ scheme, and for transmitting the optical signal to a free space; and a receiver that receives the free space transmission optical signal that is transmitted from the conversion means via the free space;

wherein the optical fiber transmission path connects the transmitter to the first terminal of the star coupler, and connects the second terminal of the star coupler to the conversion means, thereby supplying the guided light wave signal that is transmitted from the transmitter to the conversion means via the star coupler.

13. The optical communications network according to claim 12, wherein at least one of the transmitter the conversion means, and the receiver includes an optical transceiver comprising:

a light-emitting element that emits an optical signal;

a photodetecting element that converts an optical signal into an electrical signal;

first coupling means for optically coupling the light-emitting element and the photodetecting element to an optical fiber transmission path;

second coupling means for optically coupling the light-emitting element and the photodetecting element to a free space when the light-emitting element and the photodetecting element are not coupled to the optical fiber transmission path by the first coupling means;

driving means for receiving an electrical signal from an external system, for modulating the received electrical signal according to the RZ scheme, and for driving the light-emitting element in accordance with the modulated electrical signal; and output means for outputting, to an external system, the electrical signal produced by the photodetecting element.

14. The optical communications network according to claim 12, wherein at least one of the transmitter, the conversion means, and the receiver includes an optical transceiver comprising:

a first light-emitting element that emits an optical signal to an optical fiber transmission path;

a first photodetecting element that converts an optical signal coming from the optical fiber transmission path into an electrical signal;

a second light-emitting element that emits an optical signal to a free space;

a second photodetecting element that converts an optical signal coming from the free space into an electrical signal;

first coupling means for optically coupling the first light-emitting element and the first photodetecting element to the optical fiber transmission path;

second coupling means for optically coupling the second light-emitting element and the second photodetecting element to the free space;

a matrix circuit, having a transfer characteristic in which all of diagonal elements are zero, that supplies the electrical signal produced by the first photodetecting element to the second light-emitting element or an external system, supplies the electrical signal produced by the second photodetecting element to the first light-emitting element or the external system, and supplies an electrical signal that is supplied from the external system to the first or second photodetecting element;

first driving means for modulating the electrical signal that is supplied from the matrix circuit to the first light-emitting element according to the RZ scheme, and for driving the first light-emitting element in accordance with the modulated electrical signal; and second driving means for modulating the electrical signal that is supplied from the matrix circuit to the second light-emitting element, and for driving the second light-emitting element in accordance with the modulated electrical signal.

15. The optical communications network according to claim 12, wherein a light-emitting element of the transmitter emits an optical signal having a wavelength of 1,200 to 2,000 nm to the free space.

16. The optical communications network according to claim 12, wherein data transfer is performed according to a protocol using a carrier detection type collision detection method.

17. An optical communications network comprising:

a transmitter that transmits a free space transmission optical signal that is modulated according to a RZ scheme to a free space;

conversion means for receiving the free space transmission optical signal from the free space, for converting the received free space transmission optical signal into a guided light wave signal that is modulated according to the RZ scheme, and for transmitting the guided light wave signal to an optical fiber transmission path;

a star coupler having a transfer matrix in which all of diagonal elements are zero, and having at least first and second terminals; and a receiver that receives the guided light wave signal from the optical fiber transmission path;

wherein the optical fiber transmission path connects the conversion means to the first terminal of the star coupler, and connects the second terminal of the star coupler to the receiver, thereby supplying the guided light wave signal that is transmitted from the conversion means to the receiver via the star coupler.

18. The optical communications network according to claim 17, wherein at least one of the transmitter, the conversion means, and the receiver includes an optical transceiver comprising:

a light-emitting element that emits an optical signal;

a photodetecting element that converts an optical signal into an electrical signal;

first coupling means for optically coupling the light-emitting element and the photodetecting element to an optical fiber transmission path;

second coupling means for optically coupling the light-emitting element and the photodetecting element to a free space when the light-emitting element and the photodetecting element are not coupled to the optical fiber transmission path by the first coupling means;

driving means for receiving an electrical signal from an external system, for modulating the received electrical signal according to the RZ scheme, and for driving the light-emitting element in accordance with the modulated electrical signal; and output means for outputting, to an external system, the electrical signal produced by the photodetecting element.

19. The optical communications network according to claim 17, wherein at least one of the transmitter, the conversion means, and the receiver includes an optical transceiver comprising:

a first light-emitting element that emits an optical signal to an optical fiber transmission path;

a first photodetecting element that converts an optical signal coming from the optical fiber transmission path into an electrical signal;

a second light-emitting element that emits an optical signal to a free space;

a second photodetecting element that converts an optical signal coming from the free space into an electrical signal;

first coupling means for optically coupling the first light-emitting element and the first photodetecting element to the optical fiber transmission path;

second coupling means for optically coupling the second light-emitting element and the second photodetecting element to the free space;

a matrix circuit, having a transfer characteristic in which all of diagonal elements are zero, that supplies the electrical signal produced by the first photodetecting element to the second light-emitting element or an external system, supplies the electrical signal produced by the second photodetecting element to the first light-emitting element or the external system, and supplies an electrical signal that is supplied from the external system to the first or second photodetecting element;

first driving means for modulating the electrical signal that is supplied from the matrix circuit to the first light-emitting element according to the RZ scheme, and for driving the first light-emitting element in accordance with the modulated electrical signal; and second driving means for modulating the electrical signal that is supplied from the matrix circuit to the second light-emitting element, and for driving the second light-emitting element in accordance with the modulated electrical signal.

20. The optical communications network according to claim 17, wherein data transfer is performed according to a protocol using a carrier detection type collision detection method.

21. An optical communications network comprising:

a first optical transceiver that transmits a free space transmission optical signal that is modulated according to a RZ scheme to a free space, and that receives a free space transmission optical signal that is modulated according to a RZ scheme from the free space;

a second optical transceiver that transmits a guided light wave signal that is modulated according to the RZ scheme to an optical fiber transmission path, and that receives a guided light wave signal that is modulated according to the RZ scheme from an optical fiber transmission path;

a star coupler having a transfer matrix in which all diagonal elements are zero, and having at least first and second terminals;

conversion means including at least one of a first conversion means for receiving the free space transmission optical signal transmitted from the first optical transceiver, for converting the received free space transmission optical signal into a guided light wave signal that is modulated according to a RZ scheme, and for transmitting the guided light wave signal to the optical fiber transmission path, and a second conversion means for receiving the guided light wave signal transmitted from the second optical transceiver, for converting the received optical fiber transmission signal into a free space transmission optical signal that is modulated according to the RZ scheme, and for transmitting the free space transmission optical signal to the free space;

wherein the optical fiber transmission path connects the second optical transceiver to the first terminal of the star coupler, and connects the conversion means to the first terminal of the star coupler, thereby supplying the guided light wave signal that is transmitted from the second optical transceiver to the conversion means via the star coupler, or supplying the guided light wave signal that is transmitted from the conversion means to the second optical transceiver via the star coupler.

22. The optical communications network according to claim 21, wherein data transfer is performed with wavelength multiplexing by using a TDMA protocol and a protocol using a carrier detection type collision detection method.

* * * * *